(12) United States Patent
Juffa et al.

(10) Patent No.: US 7,792,895 B1
(45) Date of Patent: Sep. 7, 2010

(54) EFFICIENT MATRIX MULTIPLICATION ON A PARALLEL PROCESSING DEVICE

(75) Inventors: Norbert Juffa, San Jose, CA (US);
Radoslav Danilak, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1118 days.

(21) Appl. No.: 11/454,411

(22) Filed: Jun. 16, 2006

(51) Int. Cl.
G06F 7/52 (2006.01)

(52) U.S. Cl. .................................... 708/607

(58) Field of Classification Search ......... 708/230–232, 708/520, 607, 490, 523, 620
See application file for complete search history.

(56) References Cited

U.S. PATENT DOCUMENTS

| | | | |
|---|---|---|---|
| 5,659,778 A | 8/1997 | Gingold et al. | |
| 5,708,836 A * | 1/1998 | Wilkinson et al. | 712/20 |
| 5,892,962 A * | 4/1999 | Cloutier | 712/16 |
| 5,963,745 A * | 10/1999 | Collins et al. | 712/13 |
| 6,122,274 A * | 9/2000 | Kumar | 370/388 |
| 6,282,583 B1 * | 8/2001 | Pincus et al. | 713/375 |
| 6,532,484 B1 * | 3/2003 | Kechriotis | 708/404 |
| 6,681,388 B1 | 1/2004 | Sato et al. | |
| 7,483,937 B2 | 1/2009 | Nakanishi | |
| 7,506,134 B1 | 3/2009 | Juffa et al. | |
| 7,565,391 B2 | 7/2009 | Hu | |
| 7,584,342 B1 | 9/2009 | Nordquist et al. | |
| 2003/0195938 A1 | 10/2003 | Howard et al. | |
| 2004/0010533 A1 | 1/2004 | Castrapel et al. | |
| 2006/0064452 A1 | 3/2006 | Nakanishi | |
| 2007/0198986 A1 | 8/2007 | Panziera | |
| 2007/0271325 A1 | 11/2007 | Juffa et al. | |

OTHER PUBLICATIONS

John et al., Analysis of a Class of Parallel Matrix Multiplication Algorithms, IPPPS 98, pp. 1-23, http://www.cs.utexas.edu/users/plapack/papers/ipps98/ipps98.html.*
Eggers, et al. "Simultaneous Multithreading: A Platform for Next-Generation Processors," *IEEE Micro*, vol. 17, No. 5, pp. 12-19, Sep./Oct. 1997.
Office Action, U.S. Appl. No. 11/454,499 dtd Oct. 16, 2009.

* cited by examiner

*Primary Examiner*—Chat C Do
(74) *Attorney, Agent, or Firm*—Patterson & Sheridan, LLP

(57) ABSTRACT

The present invention enables efficient matrix multiplication operations on parallel processing devices. One embodiment is a method for mapping CTAs to result matrix tiles for matrix multiplication operations. Another embodiment is a second method for mapping CTAs to result tiles. Yet other embodiments are methods for mapping the individual threads of a CTA to the elements of a tile for result tile computations, source tile copy operations, and source tile copy and transpose operations. The present invention advantageously enables result matrix elements to be computed on a tile-by-tile basis using multiple CTAs executing concurrently on different streaming multiprocessors, enables source tiles to be copied to local memory to reduce the number accesses from the global memory when computing a result tile, and enables coalesced read operations from the global memory as well as write operations to the local memory without bank conflicts.

20 Claims, 20 Drawing Sheets

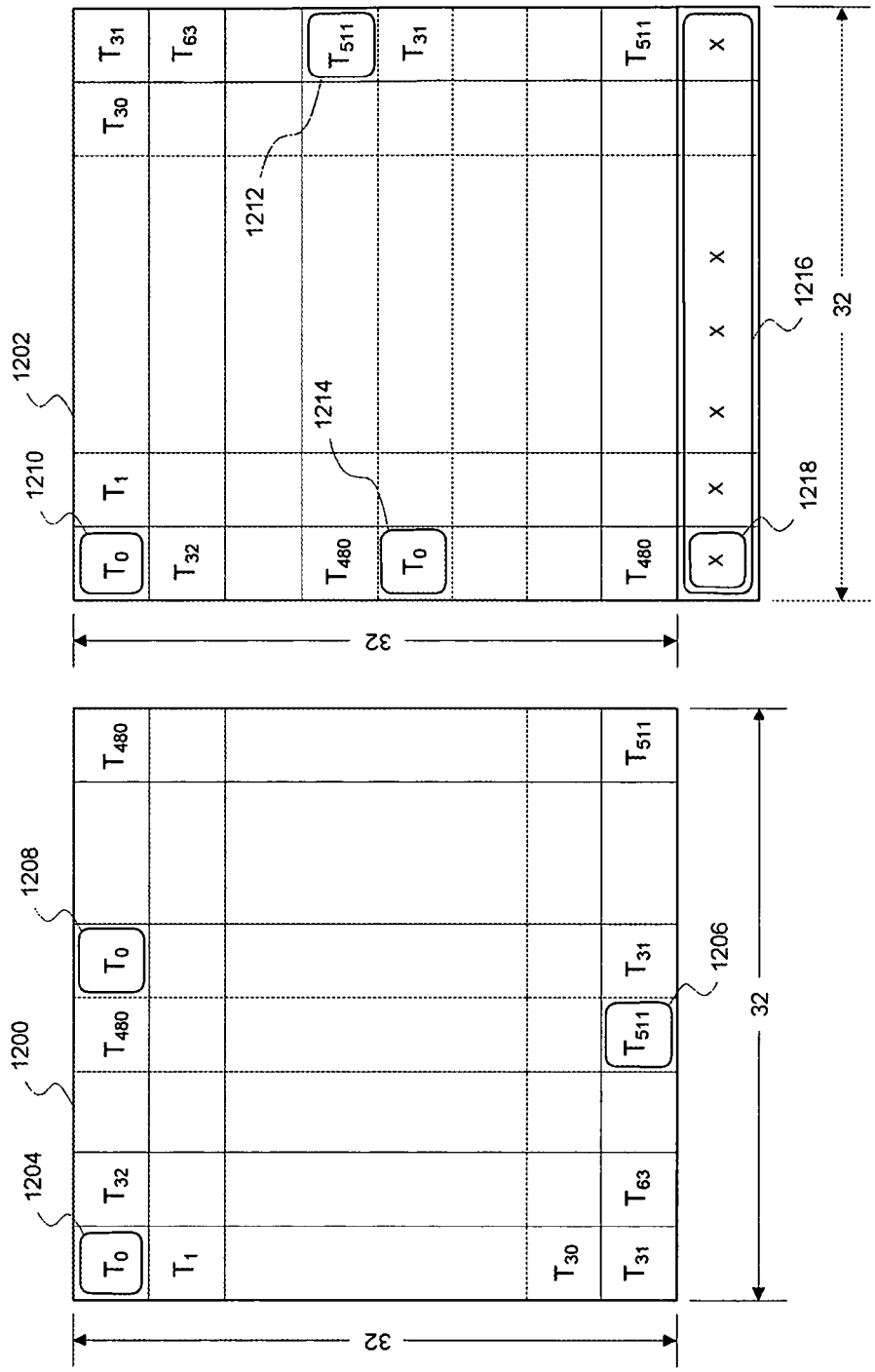

EFFICIENT MATRIX MULTIPLICATION ON A PARALLEL PROCESSING DEVICE

BACKGROUND OF THE INVENTION

1. Field of the Invention

Embodiments of the present invention relate generally to the field of computing devices and more specifically to a technique for performing efficient matrix multiplication operations on a parallel processing device.

2. Description of the Related Art

Modern computing applications oftentimes require matrix operations, such as linearly scaling a matrix, transposing a matrix or computing the product of two matrices, to be performed when carrying out certain tasks such as solving complex sets of simultaneous linear equations. Commonly, these individual matrix operations are combined into larger processing steps and executed from a scientific computing library such as the Basic Linear Algebra Subprograms ("BLAS") library. The BLAS library includes a function that performs a dot product operation on matrices "A" and "B" in memory, scales the dot product result matrix by a linear scaling factor alpha ("α"), scales a matrix "C" in memory by a linear scaling factor beta ("β"), adds the scaled dot product of "A" and "B" to the scaled "C" matrix and stores the result in matrix "C" ("C=αA·B+βC"). Additionally, one or more of matrices A, B and C may be transposed before performing the aforementioned operation.

As is well-known, matrix operations are computationally expensive, and the performance of an application may be limited by the processing time required for the matrix operations within the application. Further, as the size of the referenced matrices increases, the approximate computational cost of matrix multiplication increases with the cube of one dimension (i.e., where "n" is the number of elements in one dimension of a square matrix, the computational cost is proportional to $n^3$).

One solution to the matrix operation problem involves using the microprocessor in a personal computer to perform the matrix operations. One drawback of this approach is that such microprocessors typically have a limited amount of arithmetic and memory access logic, thereby limiting the number of concurrent arithmetic and memory operations that the microprocessor can perform as well as the overall performance of the matrix operation. Another solution involves using a multiprocessing computing device to perform the matrix operations. These devices typically have far more arithmetic and memory logic than personal computers, enabling multiprocessing computing devices to perform more concurrent arithmetic and memory operations, thereby increasing the performance of the matrix operations relative to personal computers. Such multiprocessing computing devices, however, are far more expensive than personal computers and therefore are not a cost-effective solution to the matrix operation problem.

Yet another solution to the matrix operation problem involves using a graphics processing unit within a graphics adapter to perform matrix operations since these systems are configured to rapidly execute sophisticated graphics algorithms on large video data sets and are thus capable of delivering high computational bandwidth and high memory bandwidth. Although such capabilities seem attractive for performing complex matrix operations, typical graphics processing units impose a streaming or serialized computational model, which requires a large memory bandwidth to efficiently transmit matrix data between the memory and the individual processing units. In short, the memory bandwidth requirements for efficient matrix operations typically outstrip the actual memory bandwidth provided in conventional graphics processor designs, and such limitations decrease the performance of conventional graphics processing units when executing matrix operations.

As the foregoing illustrates, what is needed in the art is a computing device that performs matrix operations in a more efficient and cost-effective manner.

SUMMARY OF THE INVENTION

One embodiment of the present invention sets forth a method for mapping a plurality of cooperative thread arrays (CTAs) to tiles of a result matrix to perform a matrix multiplication operation. The method includes the steps of defining a tile size, dividing the result matrix into a plurality of tiles based on the tile size, determining a CTA size, defining a CTA grid, and creating each CTA in the plurality of CTAs, where each CTA has a position within the CTA grid. The method also includes the steps of issuing each CTA in the plurality of CTAs, and, for each CTA, generating a set of tile positions within the result matrix that the CTA will traverse.

Another embodiment of the present invention sets forth a second method for mapping one or more CTAs to tiles of a result matrix to perform a matrix multiplication operation. The method includes the steps of defining a tile size, dividing the result matrix into one or more tiles based on the tile size, determining a CTA size, and creating a CTA for each tile. The method also includes the steps of partitioning the result matrix into a CTA grid, wherein each tile is associated with a different location within the CTA grid, and issuing a first CTA.

Another embodiment of the present invention sets forth a method for mapping the threads of a cooperative thread array to elements of a tile to perform a matrix multiplication operation, where the tile is a partition of a matrix. The method includes the steps of, for each thread, computing a row of a first tile element to which the thread should correspond, computing a column of the first tile element to which the thread should correspond, determining whether a computed location of the first tile element is within the matrix, where the computed location is defined by the computed row and the computed column, and disabling the thread, if the computed location of the first tile element is outside the matrix. The method also includes the step of, for each thread, determining whether the computed location of the first tile element is within the tile, if the computed location of the first tile element is within the matrix. The method further includes the step of, for each thread, disabling the thread, if the computed location of the first tile element is outside the tile, or executing an operation that involves the first tile element, if the computed location of the first tile element is within the tile.

Yet another embodiment of the present invention sets forth a system configured to perform a tiled matrix multiplication operation. The system includes a global memory configured to store a first source matrix, a second source matrix and a result matrix, a processing unit configured to execute a cooperative thread array, where the processing unit includes synchronization logic configured to synchronize the threads of the cooperative thread array, a local memory coupled to the processing unit and configured to store at least one tile of the first source matrix and at least one tile of the second source matrix, and a plurality of local registers coupled to the processing unit. The cooperative thread array is configured to copy a first tile from a first row of the first source matrix from the global memory to the local memory, and copy a first tile from a first column of the second source matrix from the global memory to the local memory, where the first tile copied from first column of the second source matrix corresponds to the first tile copied from first row of the first source matrix. The cooperative thread array is further configured to compute partial dot products for elements of a first tile of the result matrix based on elements of the first tile copied from the first row of the first source matrix and elements of the first tile copied from the first column of the second source matrix, and store the partial dot products for the elements of the first tile of the result matrix in the plurality of local registers. In addition, the synchronization logic synchronizes the threads of the cooperative thread array before and after partial dot product computation by (i) synchronizing the threads after the first tile from the first row of the first source matrix and the first tile from the first column of the second source matrix are copied to the local memory, but before the cooperative thread array begins computing the partial dot products for the elements of the first tile of the result matrix, and (ii) synchronizing the threads after the cooperative thread array completes computing the partial dot products for the elements of the first tile of the result matrix, but before the second tile from the first row of the first source matrix and the second tile from the first column of the second source matrix are copied to the local memory.

One advantage of the present invention is that it provides an elegant way to compute the elements of a result matrix on a tile-by-tile basis using multiple CTAs that execute concurrently on the different streaming multiprocessors of a graphics processing unit. With such an approach, substantial processing efficiencies may be achieved, not only through the parallel processes executed by the different threads within a given CTA, but also through the parallel execution of the different CTAs.

Another advantage is that copying the source tiles to local memory and accumulating the partial dot products in local registers, may substantially reduce the number of times the global memory is accessed by the CTAs when computing the result tiles of a result matrix. Thus, the latencies associated with accessing source tile data normally encountered with prior art architectures may also be substantially reduced. Further, since the local memory has a larger memory bandwidth relative to the global memory, copying the source tile data to the local memories enables repeated parallel memory accesses over larger bandwidth paths. Thus, the present invention overcomes the memory bandwidth limitations typically encountered when performing matrix operations with conventional graphics processors.

Yet another advantage is that the individual threads of a CTA may be mapped to the elements of a source tile to enable coalesced read operations from the global memory by different thread groups of the CTA. Further, the mapping in combination with the memory bank structure of the local memory also enables the thread groups to write the source tile elements to the local memory without bank conflicts when performing both non-transposed copy operations as well as transposed copy operations.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 12A-12B illustrate a mapping of threads within a CTA to individual source tile elements when performing a transposed copy operation, according to one embodiment of the invention.

DETAILED DESCRIPTION

Figure 1:
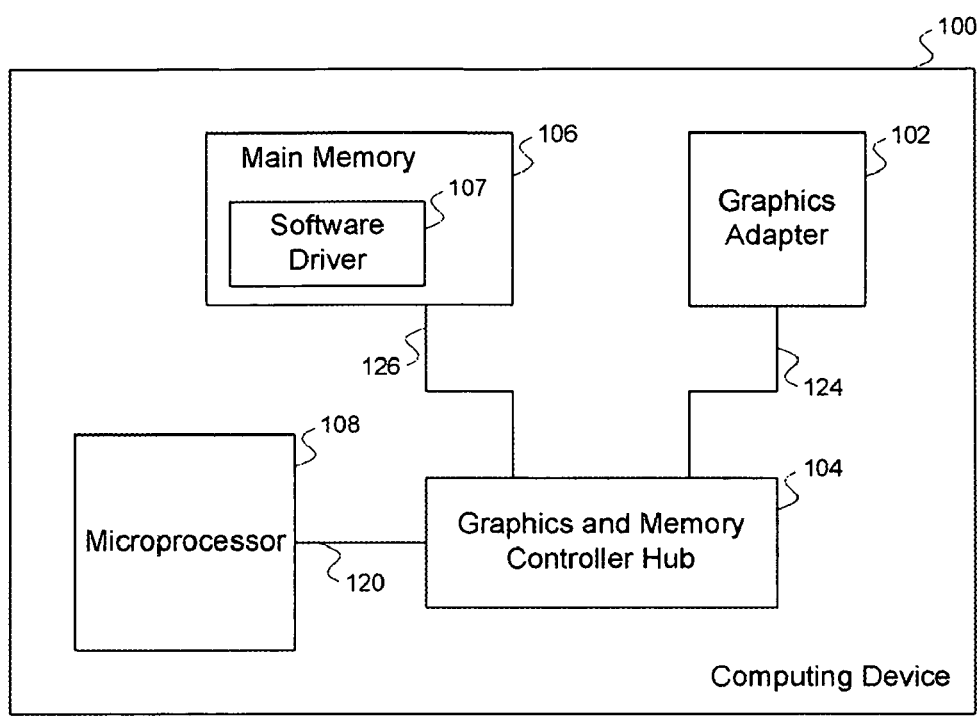
FIG. 1 illustrates a computing device in which one or more aspects of the invention may be implemented.

FIG. 1 illustrates a computing device 100 in which one or more aspects of the invention may be implemented. As shown, the computing device 100 includes a microprocessor 108, a main memory 106, a graphics adapter 102 and a graphics and memory controller hub 104. The main memory 106 includes a software driver program 107. The graphics and memory controller hub 104 is coupled to the microprocessor 108, the main memory 106 and the graphics adapter 102 through hardware interfaces 120, 126 and 124, respectively. The computing device 100 may be a desktop computer, server, laptop computer, palm-sized computer, personal digital assistant, tablet computer, game console, cellular telephone, or any other type of similar device that processes information.

Figure 2:
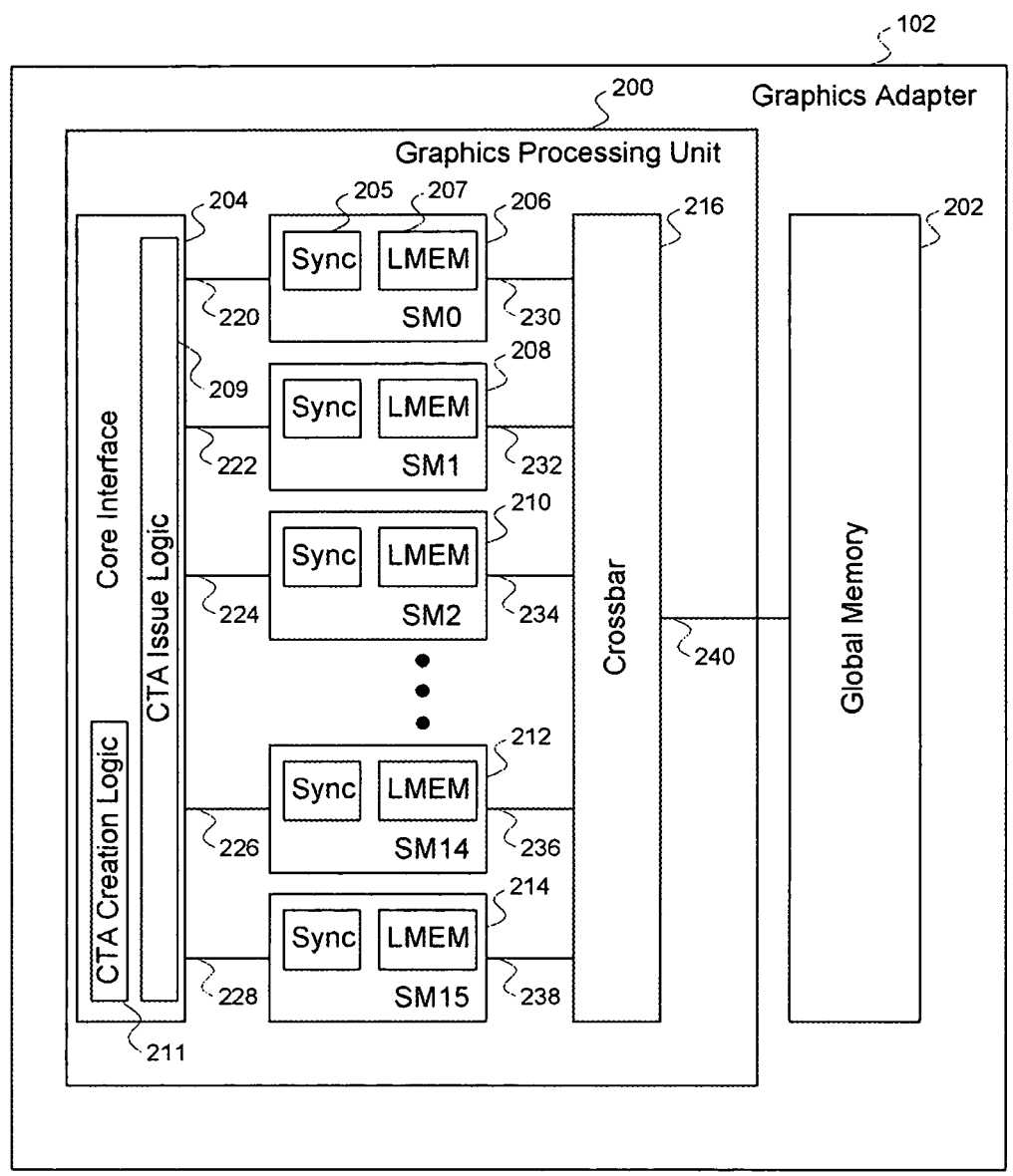
FIG. 2 illustrates the graphics adapter of FIG. 1, according to one embodiment of the invention.

FIG. 2 illustrates the graphics adapter 102 of FIG. 1, according to one embodiment of the invention. As shown, the graphics adapter 102 includes a graphics processing unit ("GPU") 200 and a global memory ("GMEM") 202. The GPU 200 includes a plurality of streaming multiprocessors, shown as "SM0" 206, "SM1" 208, "SM2" 210, "SM14" 212 and "SM15" 214. Each streaming multiprocessor is a single-instruction, multiple-data ("SIMD") multiprocessor that may execute instructions independently of the other streaming multiprocessors within the GPU 200. Each instruction executed by a streaming multiprocessor may perform arithmetic, logical and/or memory operations, including read and write operations to the GMEM 202. In an exemplary embodiment, the GPU 200 includes sixteen streaming multiprocessors, but only five have been illustrated for the sake of clarity. In other embodiments, different numbers of streaming multiprocessors may be included within the GPU 200.

As is well known, a SIMD streaming multiprocessor executes a single instruction on different data across a plurality of streaming processors included in the streaming multiprocessor. Thus, for example, the streaming multiprocessor 206 is configured to execute a series of common instructions on the streaming processors (not shown) within the streaming multiprocessor 206. The series of instructions to a single streaming processor is referred to herein as a "thread," and the collection of concurrently executing threads among the streaming processors within a streaming multiprocessor is referred to herein as a "thread group." In one embodiment with sixteen streaming processors per streaming multiprocessor, each thread group may include up to sixteen concurrently executing threads. Additionally, a plurality of thread groups may be active (in different phases of execution) at the same time on a streaming multiprocessor. This collection of thread groups is referred to herein as a "cooperative thread array" ("CTA").

The size of a particular CTA is equal to m*k, where k is the number of concurrently executing threads in a thread group and is also an integer multiple of the number of streaming processors in a streaming multiprocessor, and m is the number of thread groups simultaneously active on the streaming multiprocessor. The size of a CTA is generally determined by the amount of hardware resources, such as memory or registers, available to the CTA as well as by the size of the matrix tiles processed by the CTA. For example, in one embodiment, each streaming multiprocessor may include 8K registers in the local registerfile available for use by one or more CTAs, and each thread may use sixteen registers to perform its corresponding matrix operations. In such an embodiment, the registerfile limits the number of threads that can simultaneously execute matrix operations to 512. As described in greater detail below, when a tiled matrix multiplication operation is performed using tiles consisting of 32×32 elements, additional processing efficiencies may be achieved with CTAs that include 512 threads and thread bundles that include sixteen threads. In an alternative embodiment, a CTA may include up to 768 threads. In yet other embodiments, a CTA may include any number of threads so long as the system has sufficient hardware resources to support the execution of the CTA.

In addition to the foregoing, more than one CTA may execute on a given streaming multiprocessor if sufficient hardware resources exist to support such an approach. Thus, in an exemplary embodiment where sixteen streaming multiprocessors exist in the GPU 200, there may be sixteen or more concurrently executing CTAs within the GPU 200 at any given time.

The execution of threads within a CTA may be coordinated through the use of synchronization logic (e.g., sync 205) within each streaming multiprocessor. For example, the synchronization logic can pause individual threads at a specific instruction in the software until all threads in the CTA reach that instruction. Thus, the use of synchronization logic allows larger, single-threaded tasks to be partitioned into smaller, multithreaded tasks where data dependencies between threads may exist due to partitioning.

As also depicted in FIG. 2, the plurality of streaming processors within each streaming multiprocessor has two levels of memory available for reading and writing data. The first is a local memory ("LMEM") that may be included within each streaming multiprocessor, and the other is the GMEM 202. Each LMEM is a small (e.g., 8 KB), fast (e.g., single clock cycle access time) shared memory. For each streaming multiprocessor (e.g., SM0 206), its associated LMEM (e.g., LMEM 207) is advantageously partitioned into a number of memory banks equal to the number of threads in the thread group executing concurrently across the streaming processors of that streaming multiprocessor. Thus, each thread group has the ability to perform concurrent read or write operations across the different memory banks of the LMEM. In the exemplary embodiment where there are sixteen streaming processors within each streaming multiprocessor and sixteen concurrently executing threads in a thread group, the thread group may perform up to sixteen simultaneous read or write operations in a single clock cycle in the absence of bank conflicts, which result when different threads attempt to concurrently access different addresses within the same memory bank of the LMEM. Although a LMEM has less memory capacity than the GMEM 202, storing data that is repeatedly accessed, such the different tiles of the source matrices used in a tiled matrix multiplication operation, in a LMEM rather than in the GMEM 202 is advantageous due to the higher memory bandwidth of the LMEM. Further, because the LMEMs are local to the streaming multiprocessors, repeatedly accessing source tile data from the LMEMs instead of the GMEM 202 may substantially reduce the latencies typically encountered in prior art architectures when accessing such data.

The GPU 200 also includes a core interface 204 that couples the GPU 200 to the graphics and memory controller hub 104 of FIG. 1, through the interface 124. The core interface 204 is also coupled to the streaming multiprocessors 206, 208, 210, 212 and 214 through a plurality of couplings, shown as interfaces 220, 222, 224, 226 and 228, respectively. The core interface 204 includes CTA creation logic 211, which creates CTAs based on CTA creation requests from a software process, and CTA issue logic 209, which directs each streaming multiprocessor to execute one or more CTAs or to remain in a disabled state if no CTAs are available for execution. The CTA issue logic 209 may also be called a rasterizer. The streaming multiprocessors 206, 208, 210, 212 and 214 are coupled to the GMEM 202 through a crossbar 216, which is advantageously designed to allow any streaming multiprocessor to access any memory location in the GMEM 202. The streaming multiprocessors 206, 208, 210, 212 and 214 access the GMEM 202 through couplings 230, 232, 234, 236 and 238 to the crossbar 216, respectively, and through the coupling between the crossbar 216 and the GMEM 202, shown as interface 240. The couplings 230, 232, 234, 236, 238 and 240, allow wide data transfers (e.g., 256 bits or more) between the GMEM 202 and the streaming multiprocessors of the GPU

200. As described in greater detail below in conjunction with FIG. 9, the crossbar 216 is designed to allow a plurality of simultaneous memory accesses on contiguous memory locations within the GMEM 202 to be performed as a single, wide-memory operation referred to herein as a "coalesced" operation. Coalesced operations may allow the streaming processors to fully exploit the wide interfaces between the GMEM 202 and the streaming multiprocessors of the GPU 200. For example, a thread group consisting of sixteen threads may perform sixteen simultaneous read operations to sixteen contiguous memory addresses within the GMEM 202. These operations may be coalesced such that the sixteen parallel read operations are effectively performed as a single read operation. The ability to coalesce memory operations between the streaming multiprocessors of the GPU 200 and the GMEM 202 is important because, among other things, the GMEM 202, while large (e.g., 512 MB), may exhibit higher latency and thus lower memory performance for single address memory operations than other types of memory, such as local memory. Thus, coalescing provides a way to reduce the overall cost of accessing the GMEM 202 by exploiting the wide interface of the GMEM 202 to perform a plurality of parallel memory operations. In other embodiments, any architecture that enables functionality similar to that provided by the crossbar 216 may be implemented.

Although the graphics adapter 102 may contain additional elements, such as circuitry to generate an analog or digital video signal for display on a video display device, such additional elements were omitted for the sake of clarity. The following sets forth how work is distributed among the different threads running on the GPU 200 when matrix multiplication operations, copy and transpose operations, or copy operations are performed by the GPU 200.

Figure 3A:
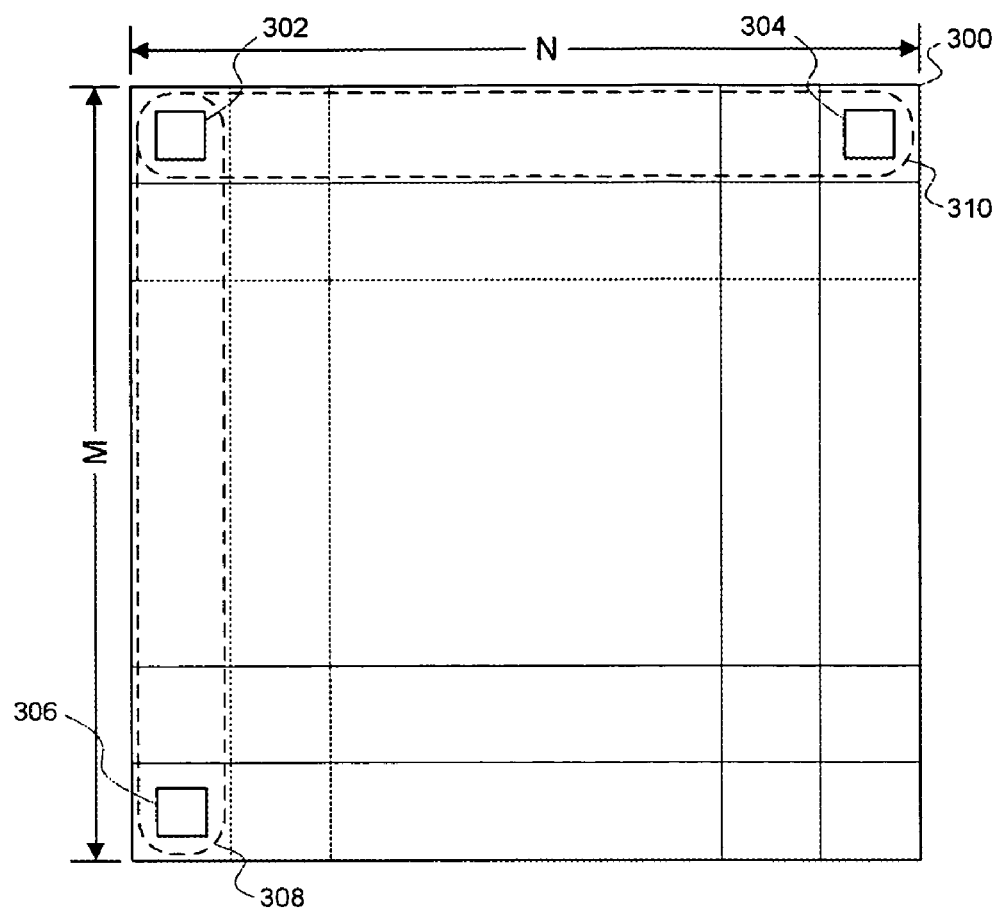
FIG. 3A illustrates an M-by-N result matrix partitioned into tiles, according to one embodiment of the invention.

FIG. 3A illustrates an M-by-N result matrix 300 partitioned into tiles, according to one embodiment of the invention. As shown, the partitioned result matrix 300 includes a plurality of tiles, including tiles 302, 304 and 306, organized into tile rows and tile columns. For example, a tile row 310 includes the tiles within a first row of a result matrix, shown as tiles 302 through tile 304, inclusive. Additionally, a tile column 308 includes the tiles within a first column of a result matrix, shown as tiles 302 through tile 306, inclusive. As described herein, in one embodiment, tiles in the right-most column or bottom row of the result matrix 300 (e.g., tiles 304 and 306) may be fully or partially within the result matrix 300, depending on whether the width ("N") and height ("M") of the result matrix 300, respectively, are integer multiples of the tile size. A description of the size and organization of individual tiles follows.

Figure 3B:
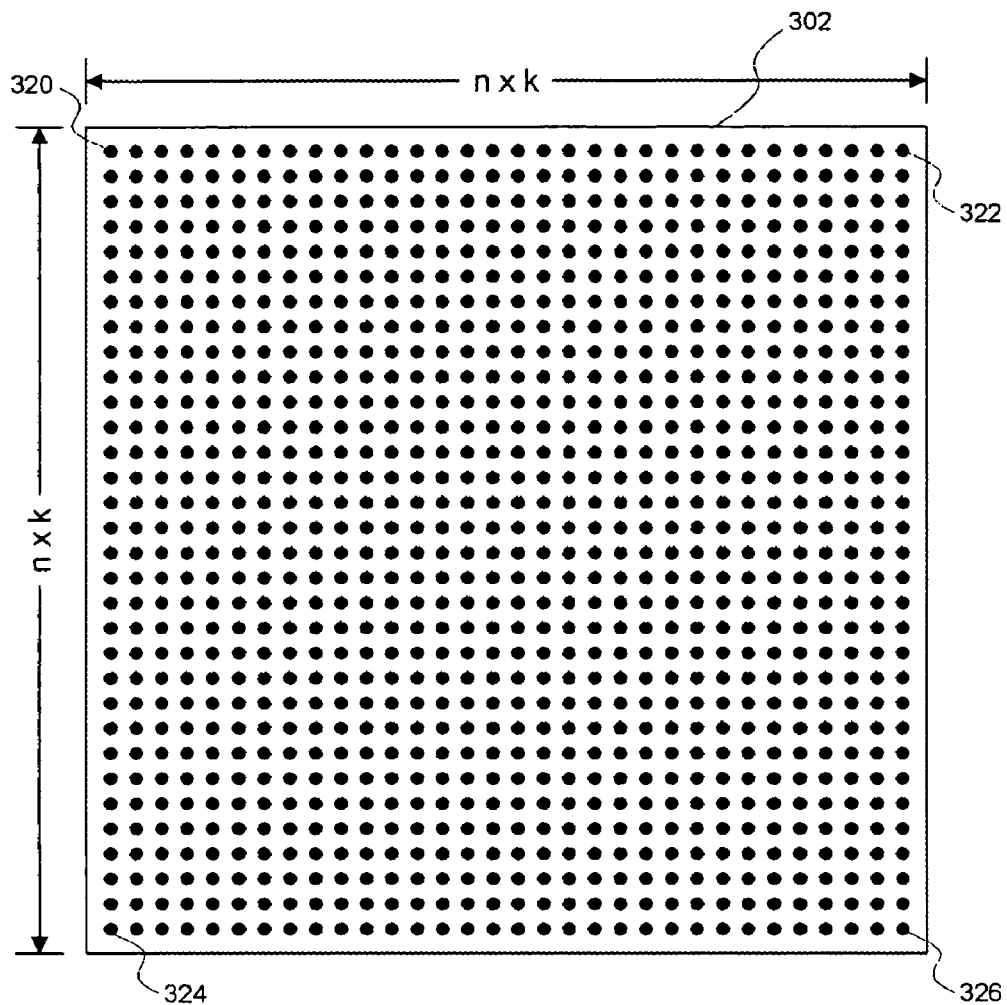
FIG. 3B illustrates a tile, which includes a plurality of tile elements, according to one embodiment of the invention.

FIG. 3B illustrates a tile 302, which includes a plurality of tile elements, according to one embodiment of the invention. As shown, the tile 302 includes n*k rows and n*k columns of individual tile elements, where n is a positive integer, and as previously described, k is the number of concurrently executing threads in a thread group. A tile element row includes the tile elements within that row, such as tile elements 320 through 322, inclusive, while a tile element column includes the tile elements within that column, such as tile elements 320 through 324, inclusive.

The performance of matrix operations is influenced by the size and shape of the tiles, which are determined by balancing several competing factors. First, it is commonly known that tiled matrix multiplication operations are performed more efficiently when larger and square tiles are used rather than smaller and/or non-square tiles. For example, using larger tiles requires fewer source tile copy operations to the local memory during such operations, as described below in FIG. 7, and square tiles are better able to support efficient transposition operations. Second, selecting a tile size whose dimensions are an integer multiple of k optimizes the use of memory bandwidth between the local memory and its corresponding streaming processors since all k threads in each thread group may be fully utilized and bank conflicts in the local memory may be avoided by reading contiguous addresses. Third, the size of the local memory limits the size of the tiles because, as described below in FIG. 7, at least two source tiles are copied into the local memory when performing a tiled matrix multiplication operation. Finally, those skilled in the art will recognize that tile dimensions that are powers of two may offer improved performance over other alternative dimension sizes and that source matrix tiles and result matrix tiles should be the same size for efficient tiled matrix multiplication operations.

In addition to the foregoing, the size of the CTAs and the size of the tiles influence one another. For example, performance may be improved by fully utilizing all threads within the CTA during matrix operations. Full thread utilization may be achieved by distributing the work of the matrix operations evenly across all threads in the CTA, which may occur if the number of elements in the tile is an even multiple of the number of threads in the CTA. Further, the performance of matrix operations may be improved by ensuring that the number of threads in the CTA does not exceed the number of elements in the tile, since coordinating the operation of two or more threads on a single matrix element typically involves using complex synchronization techniques, which may reduce overall processing efficiency.

Again, in the exemplary embodiment, where there are sixteen streaming processors in the streaming multiprocessor and the thread group includes sixteen threads, using a tile width and height of thirty-two elements has been shown to be advantageous. Also, as described above in FIG. 2, where the streaming multiprocessor has 8K registers in the local registerfile, and each thread uses sixteen registers to perform its corresponding matrix operations, only one CTA of 512 threads executes on each streaming multiprocessor. In such a scenario, if the tile includes 1024 tile elements (32×32), then each thread in a CTA processes two tile elements.

In alternative embodiments, different tile sizes may be possible or preferable based on several factors, including, without limitation, having different local memory or local registerfile sizes, different numbers of memory banks in the local memory, and/or different numbers of local registers available to each thread. Thus, the sizes of the CTAs and tiles in no way limit the scope of the present invention.

Figure 4A:
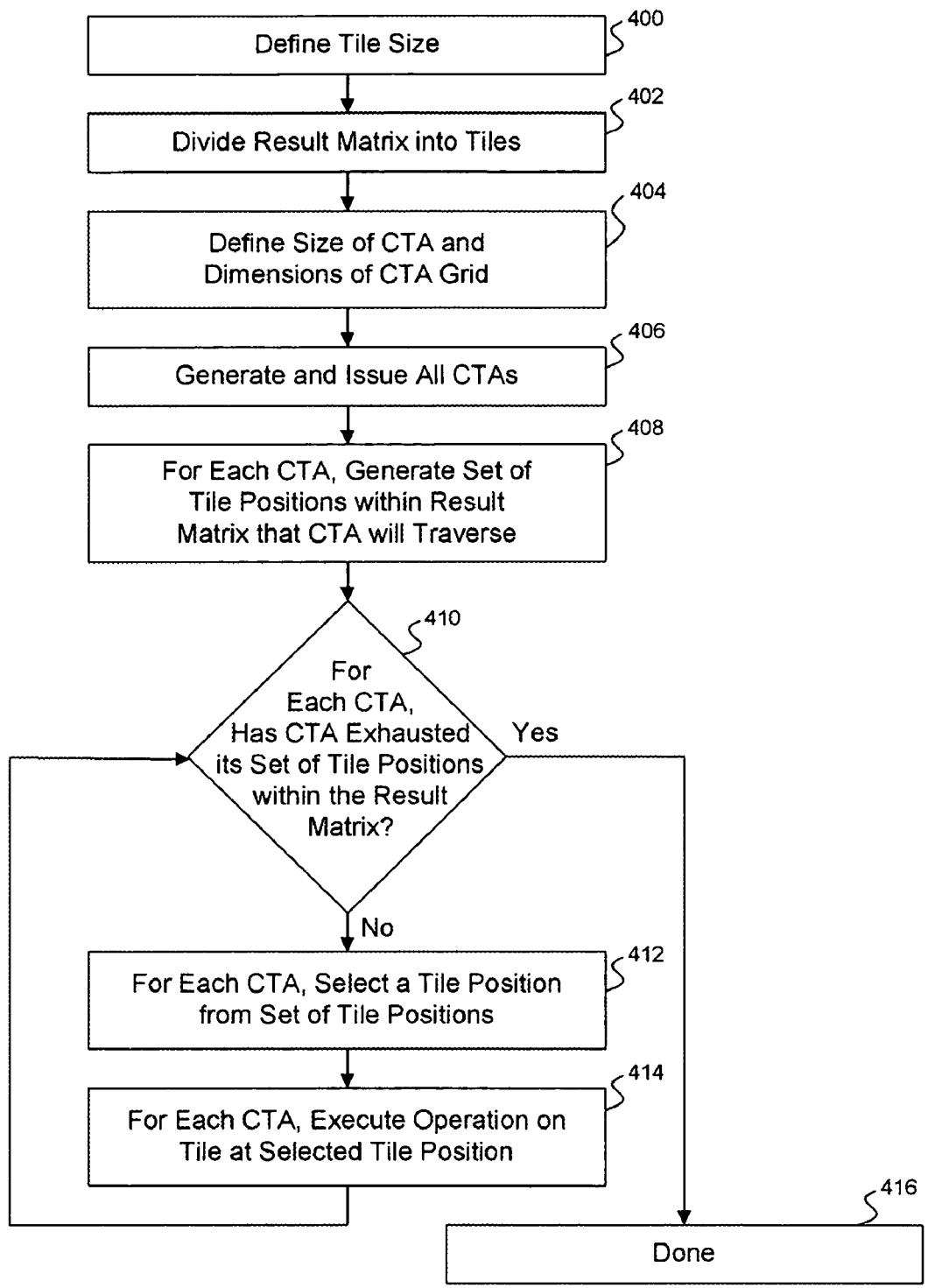
FIGS. 4A and 4B illustrate a flowchart of method steps for allocating work among a plurality of CTAs executing within a GPU when performing a matrix multiplication operation, according to one embodiment of the invention.

FIG. 4A illustrates a flowchart of method steps for allocating work among a plurality of CTAs executing within a GPU when performing a matrix multiplication operation, according to one embodiment of the invention. Although the method steps are described with respect to a plurality of CTAs executing on a plurality of the streaming multiprocessors of the graphics processing unit 200 of FIG. 2, persons skilled in the art will understand that any system configured to execute the method steps, in any order, is within the scope of the present invention.

The method for allocating work among a plurality of CTAs begins in step 400, where a software process, such as a software driver, defines the size of the tiles into which the result matrix will be divided. As described above in conjunction with FIGS. 3A-3B, the tile size depends on several competing factors, such as the size of the local memory within each streaming multiprocessor and the known advantages of making each tile square and as large as possible. In step 402, the result matrix is divided into tiles (also referred to herein as "result tiles"). Persons skilled in the art will understand that when either the size of either dimension of the result matrix is not an integer multiple of the size of the tile in that same dimension, partial tiles result. In one embodiment, the result matrix is partitioned such that the partial tiles are in the right-most column and bottom row of the matrix.

In step 404, a software process determines the size of the CTAs. As previously described herein, the CTA size is generally determined by the amount of hardware resources within the streaming multiprocessors available to the CTAs as well as by the size of the result tiles. For example, in the embodiment of FIG. 3B where the result tiles consist of 32×32 elements, additional processing efficiencies are achieved when the CTAs include 512 threads. The software process also defines the dimensions of the CTA grid. In the exemplary embodiment, where there are sixteen streaming multiprocessors in the GPU 200 and one CTA executing on each streaming multiprocessor, the CTA grid is defined as a four-by-four array of sixteen CTAs. In alternative embodiments, the CTA grid may have other dimensions.

In step 406, a software process requests that the CTA creation logic 211 create a CTA for each position within the CTA grid. The CTA creation logic 211 then generates the CTAs, and the issue logic 209 issues each CTA as processing resources allow. When being issued, each CTA is assigned to a specific position within the CTA grid using a unique two-dimensional identifier. In step 408, for each CTA, a software process generates a set of tile positions within the result matrix that the CTA will traverse. The method for generating the sets of tile positions is described in greater detail below in FIG. 4B. In step 410, a software process determines, for each CTA, whether the CTA has exhausted all positions in its respective set of tile positions. If the CTA has exhausted its respective set of tile positions, then the method proceeds to step 416, where the CTA terminates. Persons skilled in the art will recognize that there may be one or more CTAs that are created and issued, but nonetheless do not traverse any tile positions within the result matrix. Such CTAs terminate immediately without performing any processing operations. If, in step 410, the software process determines, for each CTA, that the CTA has not exhausted its respective set of tile positions, then the method proceeds to step 412.

In step 412, for each CTA, a software process selects a tile position from the set of tile positions generated for the CTA. In step 414, each CTA processes the result tile associated with the tile position selected for the CTA. For each CTA, the method returns to step 410 after the CTA processes its respective result tile.

Figure 4B:
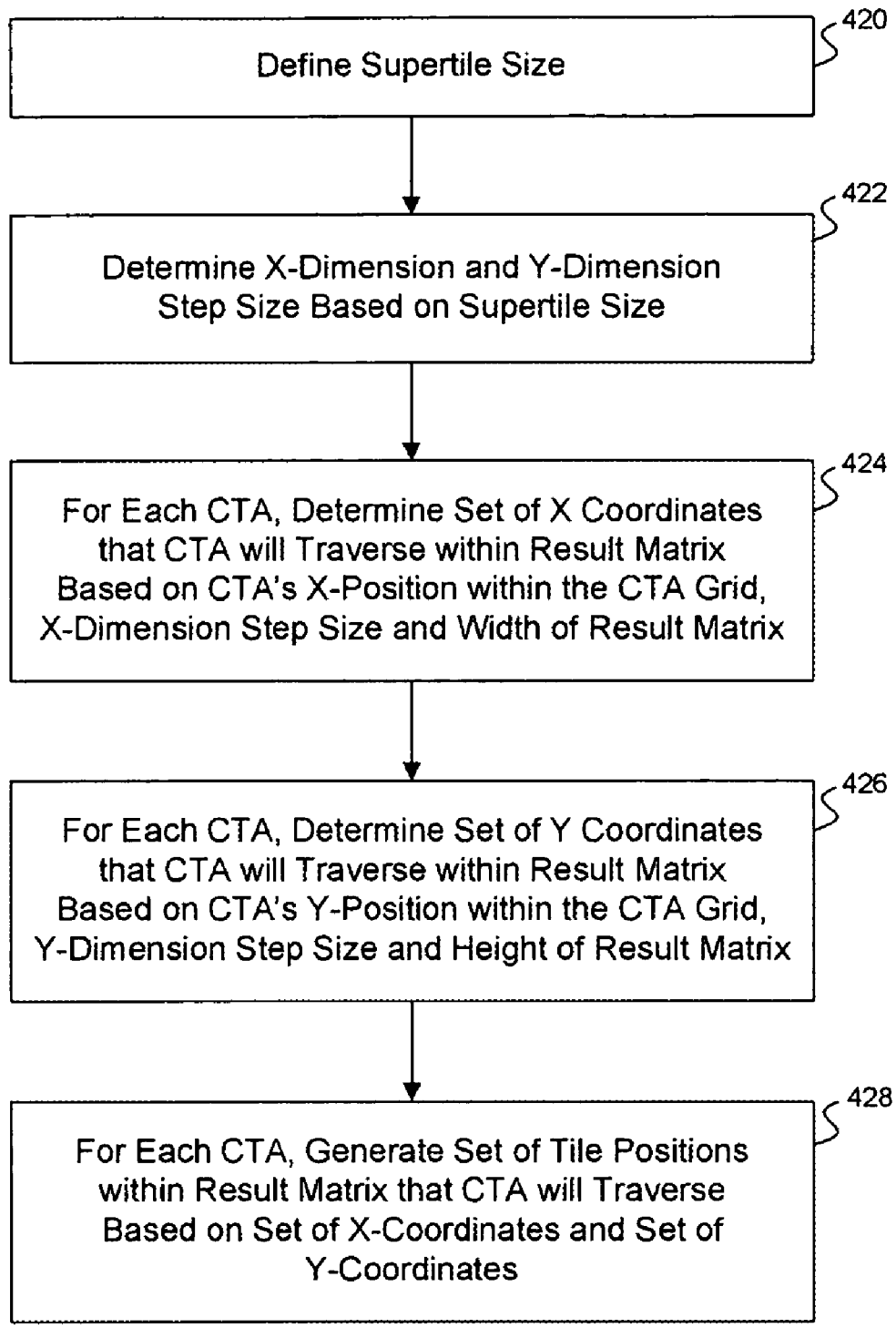

FIG. 4B illustrates a flowchart of method steps for generating a set of tile positions within the result matrix that a CTA will traverse, according to one embodiment of the invention. Persons skilled in the art will understand that any system configured to execute the method steps, in any order, is within the scope of the present invention.

Figure 5A:
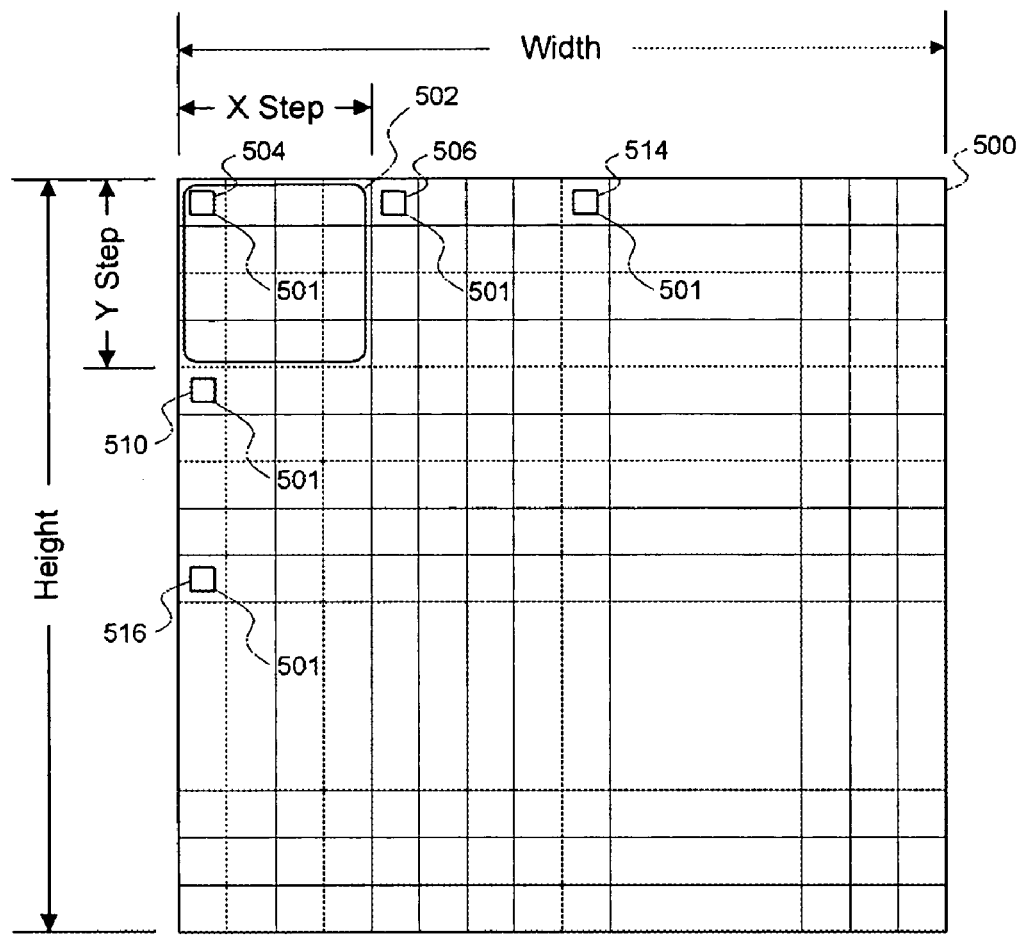
FIGS. 5A-5E illustrate a walking pattern through a result matrix followed by a CTA during a matrix multiplication operation, according to one embodiment of the invention.
Figure 5B:
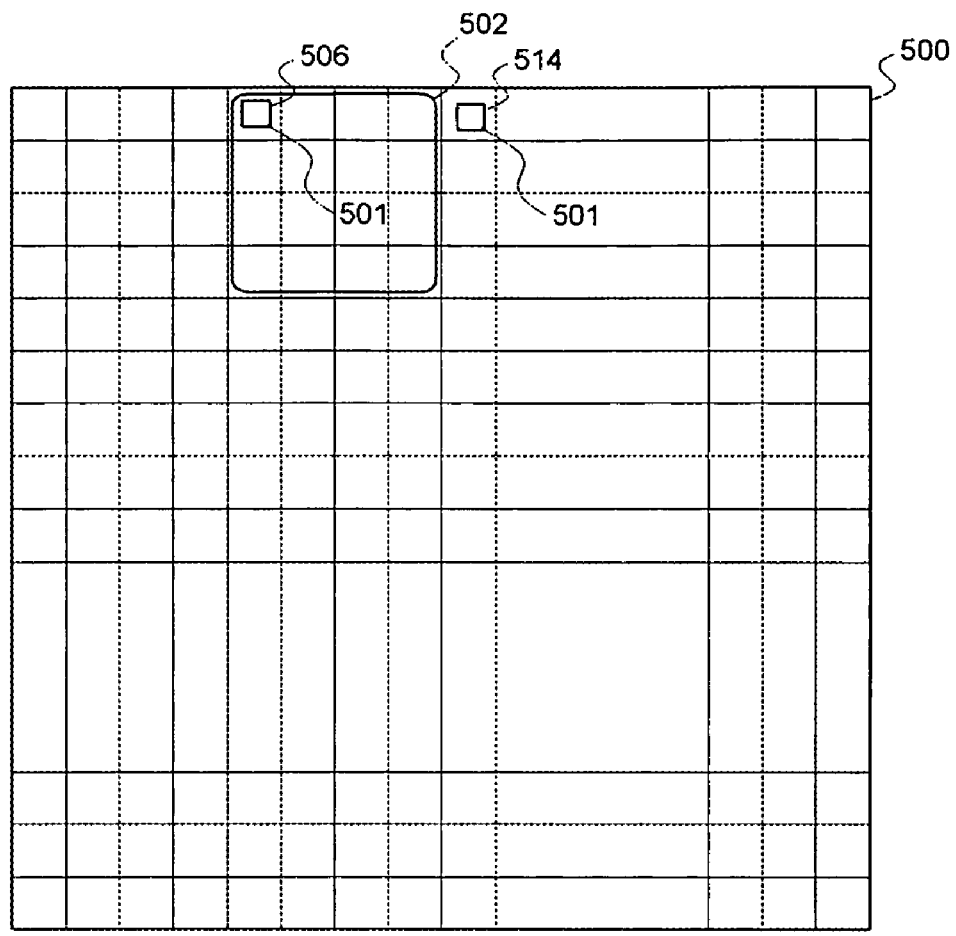
Figure 5C:
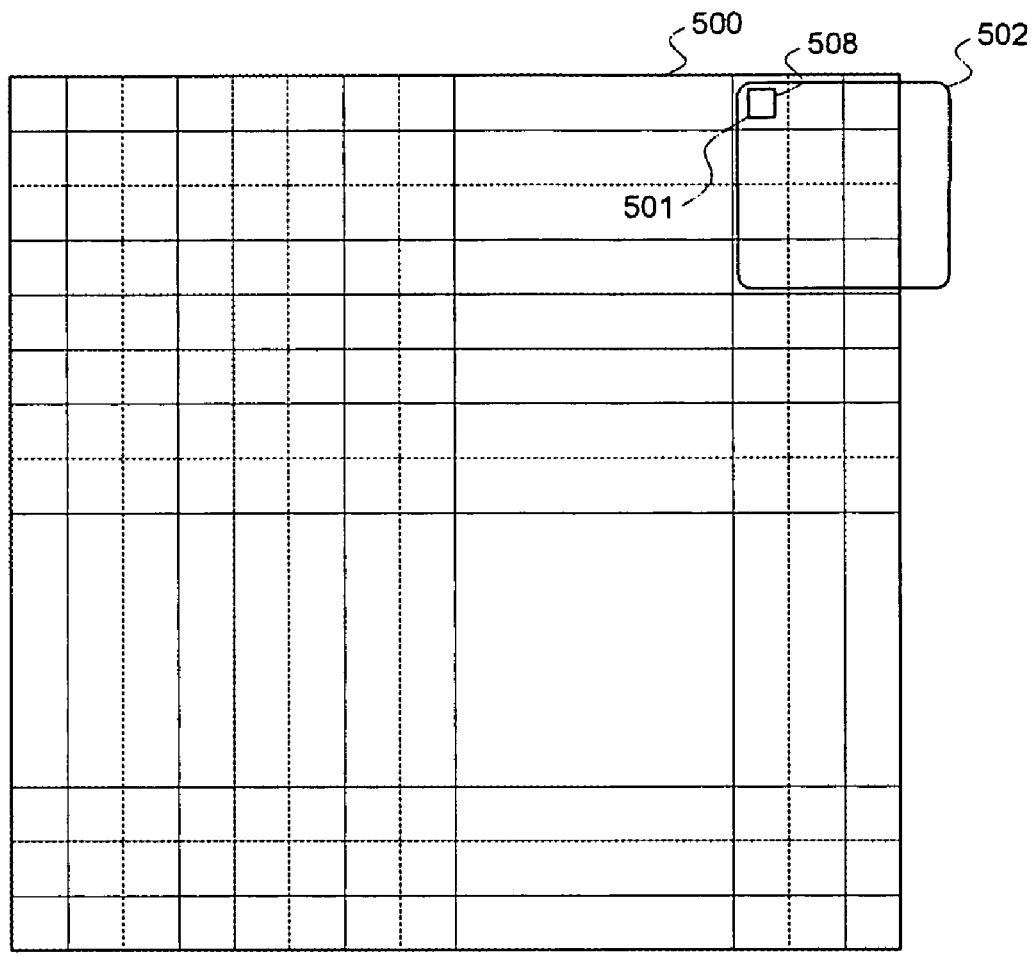
Figure 5D:
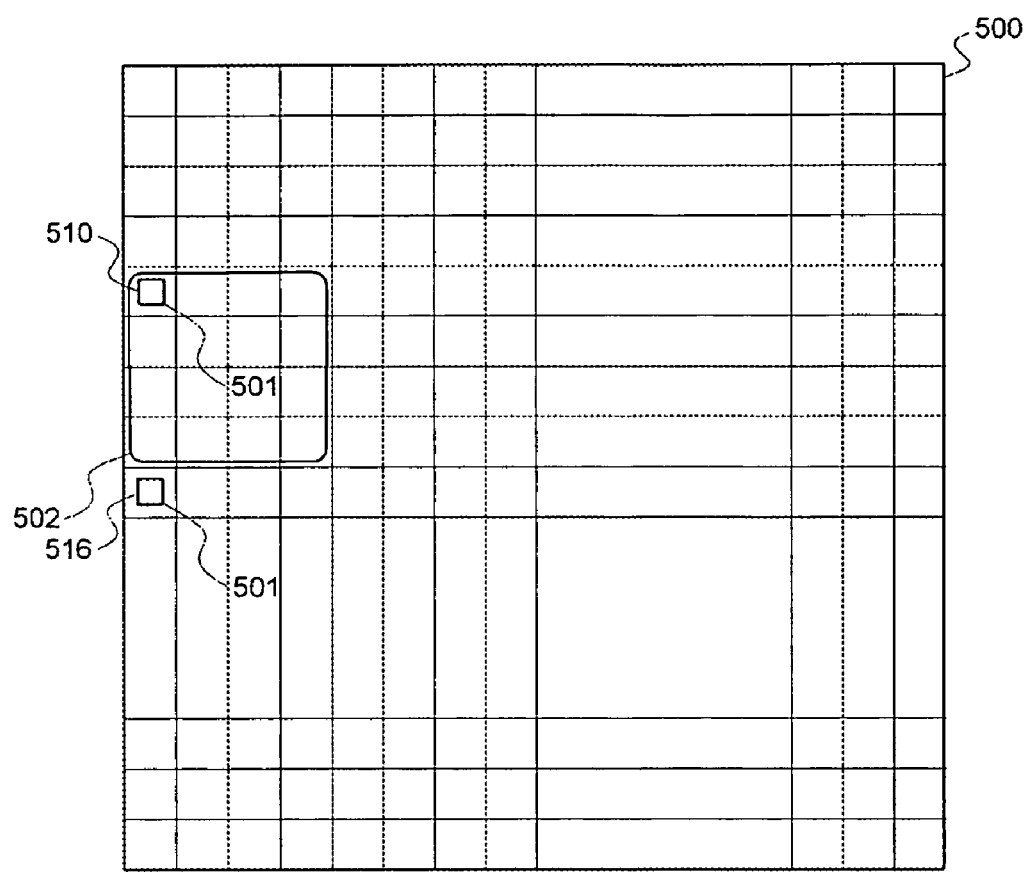
Figure 5E:
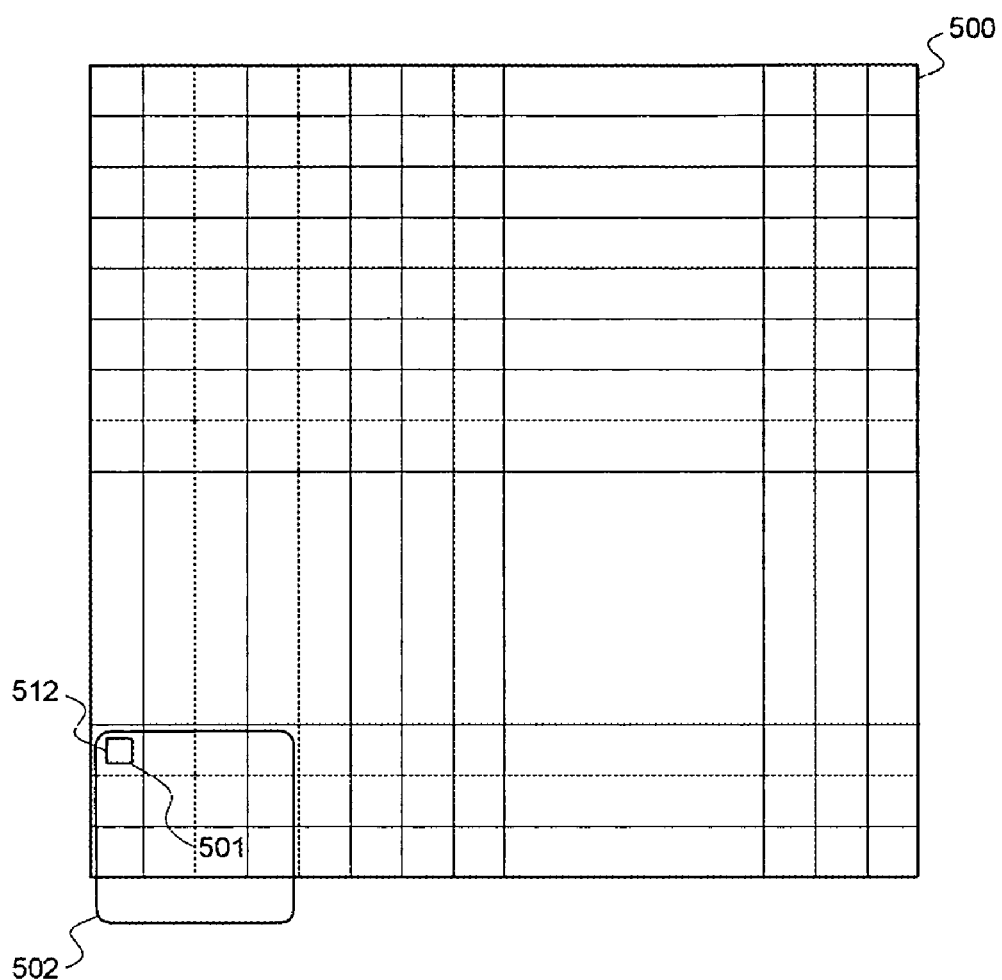

The method for generating a set of tile positions begins in step 420, where a software process defines a supertile size. In one embodiment, the supertile has the same dimensions as the CTA grid, but consists of tiles instead of CTAs. Thus, in the exemplary embodiment described above in FIG. 4A, the supertile is configured as a four-by-four array of tiles. In step 422, a software process determines an x-dimension step size and a y-dimension step size for the CTAs based on the supertile size. Referring to FIG. 5A, a result matrix 500 is shown divided into tiles. A CTA grid 502 is configured as a four-by-four array of CTAs overlapping a supertile configured as a four-by-four array of tiles. An x-dimension step size is shown as the x-dimension of the supertile, and a y-dimension step size is shown as the y-dimension of the supertile. Thus, both the x-dimension step size and the y-dimension step size equal four tiles. A CTA 501 is also shown at its assigned position within the CTA grid.

In step 424, a software process determines a set of x-coordinates that the CTA will traverse within the result matrix based on the CTA's x-position within the CTA grid, the x-dimension step size and the width of the result matrix. Referring again to FIG. 5A, a partial set of x-coordinates that CTA 501 will traverse within the result matrix 500 is shown as positions 504, 506 and 508 within the result matrix 500. Position 504 represents the x-position of CTA 501 within the CTA grid 502 when the upper left corner of the CTA grid 502 is aligned with the upper left corner of the result matrix 500. Each of positions 506 and 514 is offset from position 504 in the x-dimension by an integer multiple of the x-dimension step size. Thus, position 506 is four tiles in the x-dimension from position 504, and position 514 is eight tiles in the x-dimension from position 504. The process of offsetting in the x-dimension from position 504 by increasing integer multiples of the x-dimension step size is repeated until the entire width of the result matrix 500 is traversed.

In step 426, a software process determines a set of y-coordinates that the CTA will traverse within the result matrix based on the CTA's y-position within the CTA grid, the y-dimension step size and the height of the result matrix. Referring again to FIG. 5A, a partial set of y-coordinates that CTA 501 will traverse within the result matrix 500 is shown as positions 504, 510 and 516 within the result matrix 500. Position 504 represents the y-position of CTA 501 within the CTA grid when the upper left corner of the CTA grid 502 is aligned with the upper left corner of the result matrix 500. Each of positions 510 and 516 is offset from position 504 in the y-dimension by an integer multiple of the y-dimension step size. Thus, position 510 is four tiles in the y-dimension from position 504, and position 516 is eight tiles in the y-dimension from position 504. The process of offsetting from position 504 in the y-dimension by increasing integer multiples of the y-dimension step size is repeated until the entire height of the result matrix 500 is traversed.

In step 428, a software process generates a set of tile positions within the result matrix that the CTA will traverse by combining each of the x-coordinates computed in step 424 with each of the y-coordinates computed in step 426.

FIGS. 5B-5E illustrate the different tiles of the result matrix 500 that CTA 501 may process as it traverses the different tile positions computed using the method of FIG. 4B. As shown, at each tile position, CTA 501 maintains its assigned position within the CTA grid 502. Importantly, when traversing its set of tile positions, a given CTA may process the different tiles in any order. Further each CTA processes its respective tiles independently of the other CTAs executing on the GPU 200. Thus, when a CTA finishes processing a particular tile, the CTA may process the next tile without waiting for the other CTAs to finish processing their current tiles.

One advantage of the method of FIGS. 4A and 4B is that it provides a way to compute the elements of a result matrix on a tile-by-tile basis. With this approach, the result matrix is completely computed once all of the issued CTAs have exhausted their sets of tile positions and completed all related tiled matrix multiplication operations. Further, since multiple CTAs execute concurrently on the different streaming multiprocessors of the GPU 200, substantial processing efficiencies may be achieved, not only through the parallel processes executed by the different threads within a given CTA, but also through the parallel execution of the different CTAs. Although the method of FIGS. 4A and 4B may be implemented with a result matrix of any size, this technique has been found to be particularly useful when the result matrix is larger in any dimension than the largest possible CTA grid that the GPU 200 can support or when each result matrix dimension is a multiple of the corresponding supertile dimension.

Figure 6:
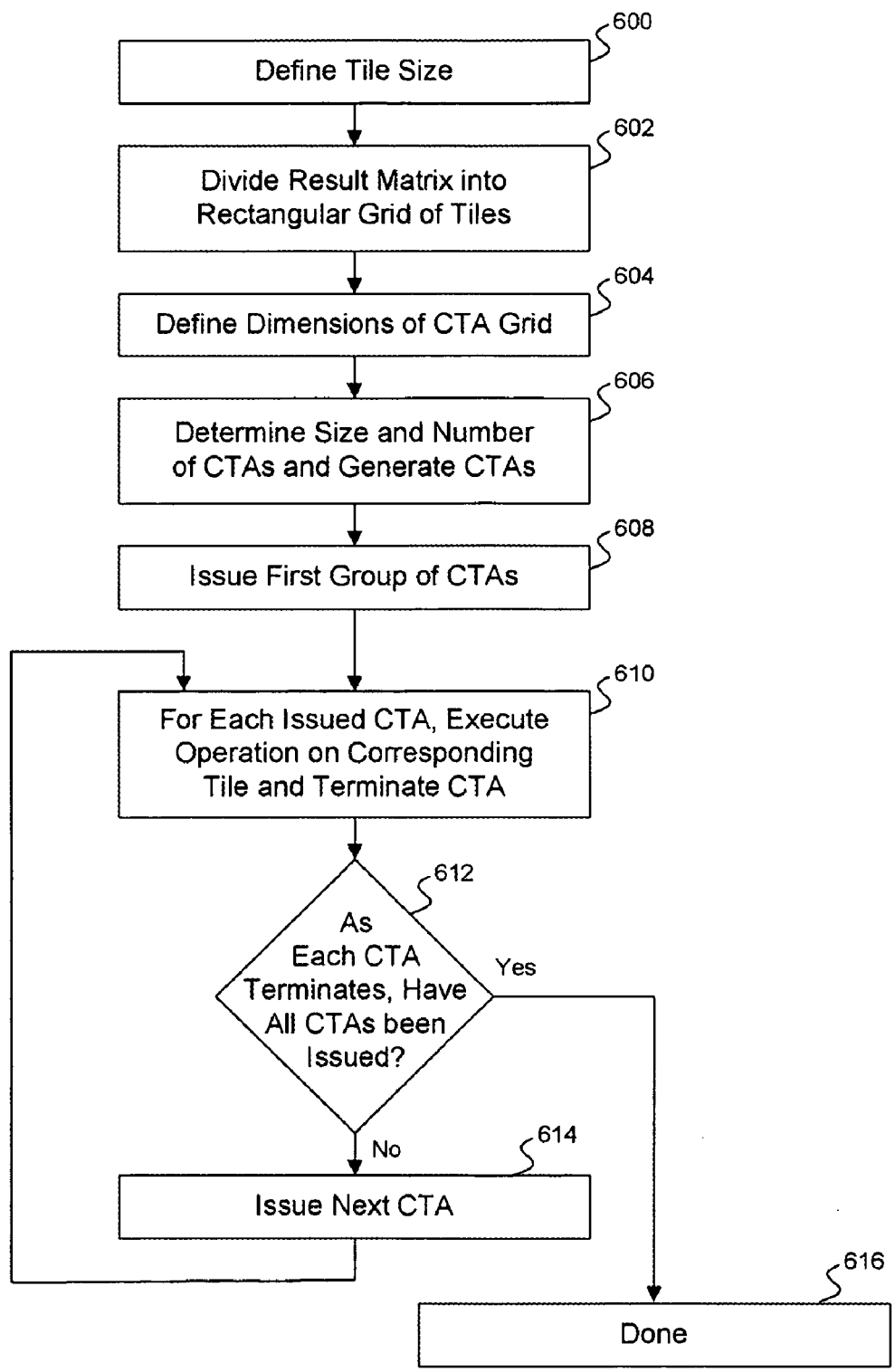
FIG. 6 illustrates a flowchart of method steps for allocating work among a plurality of CTAs executing within a GPU when performing a matrix multiplication operation, according to another embodiment of the invention.

FIG. 6 illustrates a flowchart of method steps for allocating work among a plurality of CTAs executing within a GPU when performing a matrix multiplication operation, according to another embodiment of the invention. While the method of FIGS. 4A and 4B may be used regardless of the size of the result matrix being computed, the method of FIG. 6 may be advantageously implemented in cases where the largest matrix size that can be supported by the various hardware resources within the GPU 200 is larger in both dimensions than the result matrix being computed. The largest matrix size that can be supported is equal to the CTA grid dimensions multiplied by the tile size. Although the method steps are described with respect to a plurality of CTAs executing on a plurality of the streaming multiprocessors of the graphics processing unit 200 of FIG. 2, persons skilled in the art will understand that any system configured to execute the method steps, in any order, is within the scope of the present invention.

The method of allocating work among the plurality of CTAs begins in step 600, where a software process, such as a software driver, defines the size of the tiles into which the result matrix will be divided. Again, the tile size depends on several competing factors, such as the size of the local memory within each streaming multiprocessor and the known advantages of making each tile square and as large as possible. In step 602, the result matrix is divided into the smallest rectangular grid of result tiles that covers the entire matrix. As previously described, when the size of either dimension of the result matrix is not an integer multiple of the size of the tile in that same dimension, partial tiles result. In one embodiment, the result matrix is partitioned such that the partial tiles are in the right-most column and bottom row of the matrix. After step 602 is completed, the result matrix is divided into a grid of p*q tiles (and maybe partial tiles as well).

In step 604, a software process defines the dimensions of a CTA grid. In one embodiment, the CTA grid has dimensions p*q such that each result tile or partial result tile into which the result matrix is divided may be associated with a specific location within the CTA grid. As described below, this structure allows a one-to-one mapping between the result tiles (and, if applicable, partial result tiles) and CTAs, with each CTA computing a particular result tile (or, if applicable, partial result tile). In step 606, a software process determines the size of the CTAs. As previously described herein, the CTA size is generally determined by the amount of hardware resources within the streaming multiprocessors available to the CTAs as well as by the size of the result tiles. For example, in the embodiment of FIG. 3B where the result tiles consist of 32×32 elements, additional processing efficiencies are achieved when the CTAs include 512 threads. Once the CTA size is determined, a software process requests that the CTA creation logic 211 generate a different CTA for each result tile or partial result tile into which the result matrix is divided, thus creating a one-to-one mapping between result tiles and CTAs. Each CTA is responsible for computing its respective result tile. Upon receiving the CTA creation request, the CTA creation logic 211 generates the CTAs.

In step 608, the CTA issue logic 209 within the GPU 200 issues a first group of CTAs. Although the number of CTAs that may be included in the first group may vary, the number may not exceed the number of CTAs that can execute concurrently on the GPU 200. Thus, in the exemplary embodiment where the GPU 200 includes sixteen streaming multiprocessors, and only one CTA executes on each streaming multiprocessor, up to sixteen CTAs may be in the first group of issued CTAs. In step 610, each issued CTA processes one of the result tiles or partial result tiles into which the result matrix is divided. When issuing each CTA, the CTA issue logic 209 assigns a CTA grid location to the CTA using a unique two-dimensional identifier, and the CTA is responsible for processing the result tile or partial result tile that is associated with the CTA grid location to which the CTA is assigned. As described in greater detail below in conjunction with FIGS. 7-8E, each CTA executes a tiled matrix multiplication operation to compute the elements of the result tile or partial result tile associated with the CTA grid location to which the CTA is assigned. Once an issued CTA completes the tiled matrix multiplication operation, the CTA terminates.

In step 612, when an issued CTA terminates, the CTA issue logic 209 determines whether all of the CTAs have been issued. If the CTA issue logic 209 determines that all of the CTAs have been issued, then the method terminates in step 616. However, if the CTA issue logic 209 determines that all of the CTAs have not yet been issued, then the method proceeds to step 614, where the CTA issue logic 209 issues another CTA. The method then returns to step 610.

One advantage of the foregoing method is that it provides an elegant way to compute the elements of a result matrix on a tile-by-tile basis. With such an approach, the result matrix is completely computed once all of the CTAs have issued, completed their respective tiled matrix multiplication operations and terminated. Further, since multiple CTAs execute concurrently on the different streaming multiprocessors of the GPU 200, substantial processing efficiencies may be achieved, not only through the parallel processes executed by the different threads within a given CTA, but also through the parallel execution of the different CTAs.

Figure 7:
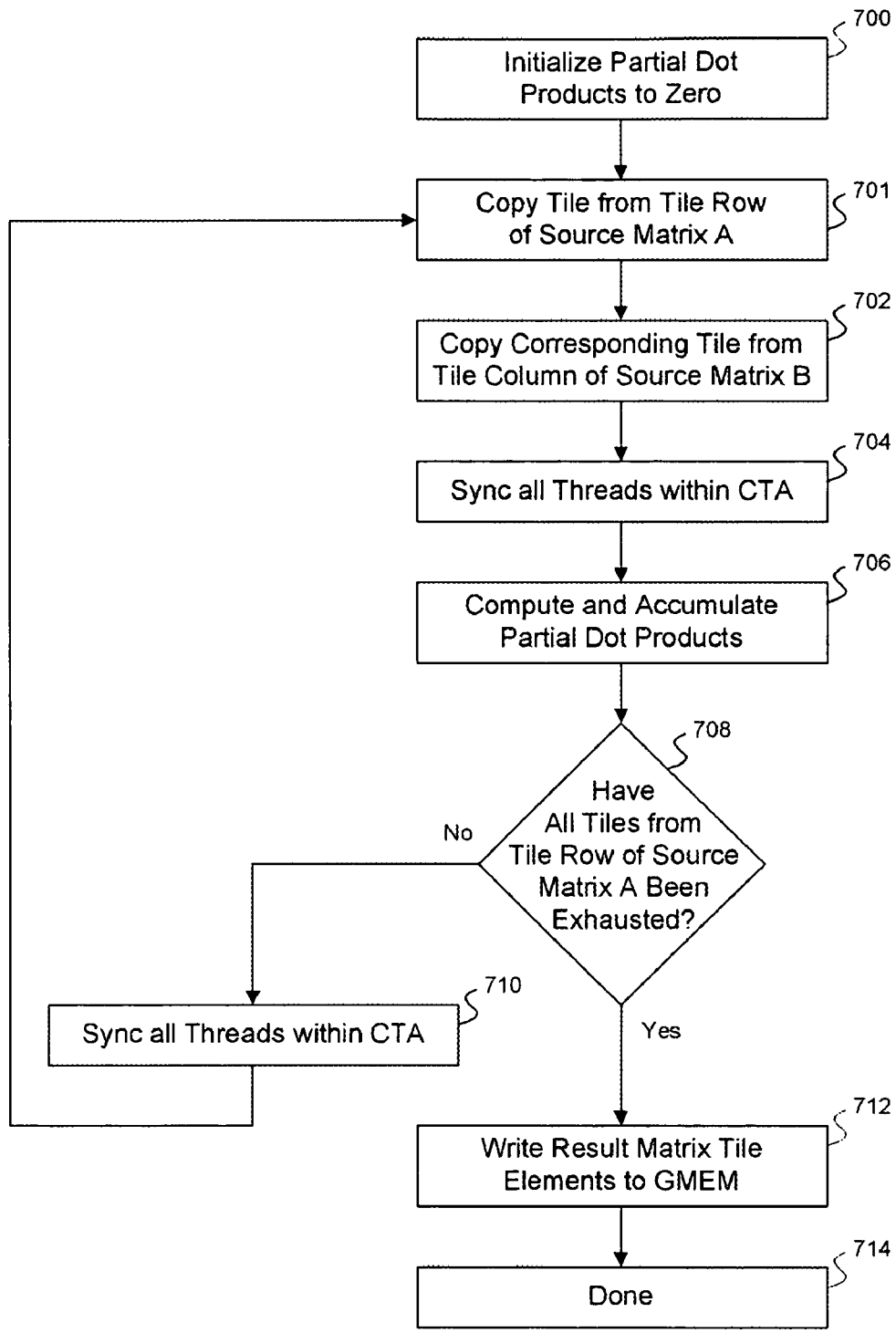
FIG. 7 illustrates a flowchart of method steps executed by a system configured to perform a tiled matrix multiplication operation, according to one embodiment of the invention.
Figure 8A:
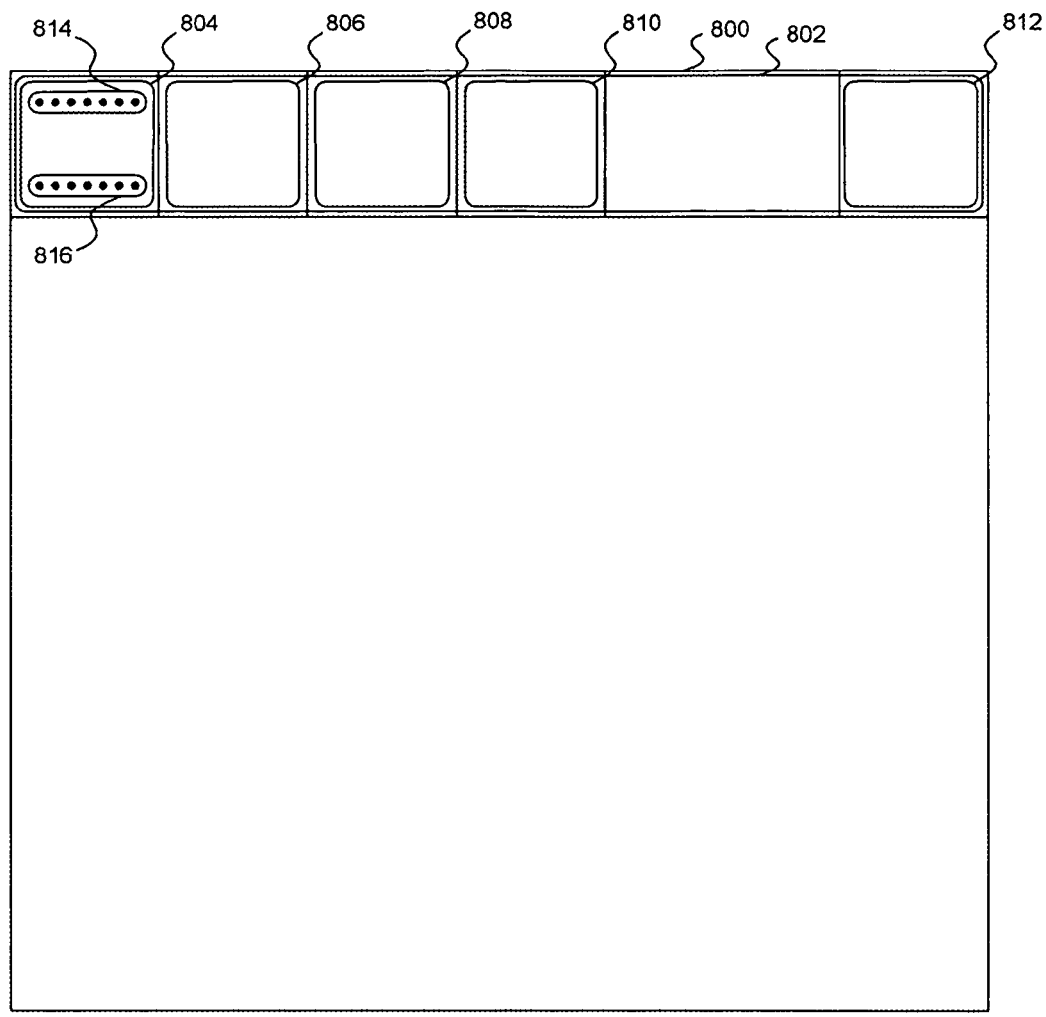
FIG. 8A illustrates a first source matrix used in the tiled matrix multiplication operation of FIG. 7.
Figure 8B:
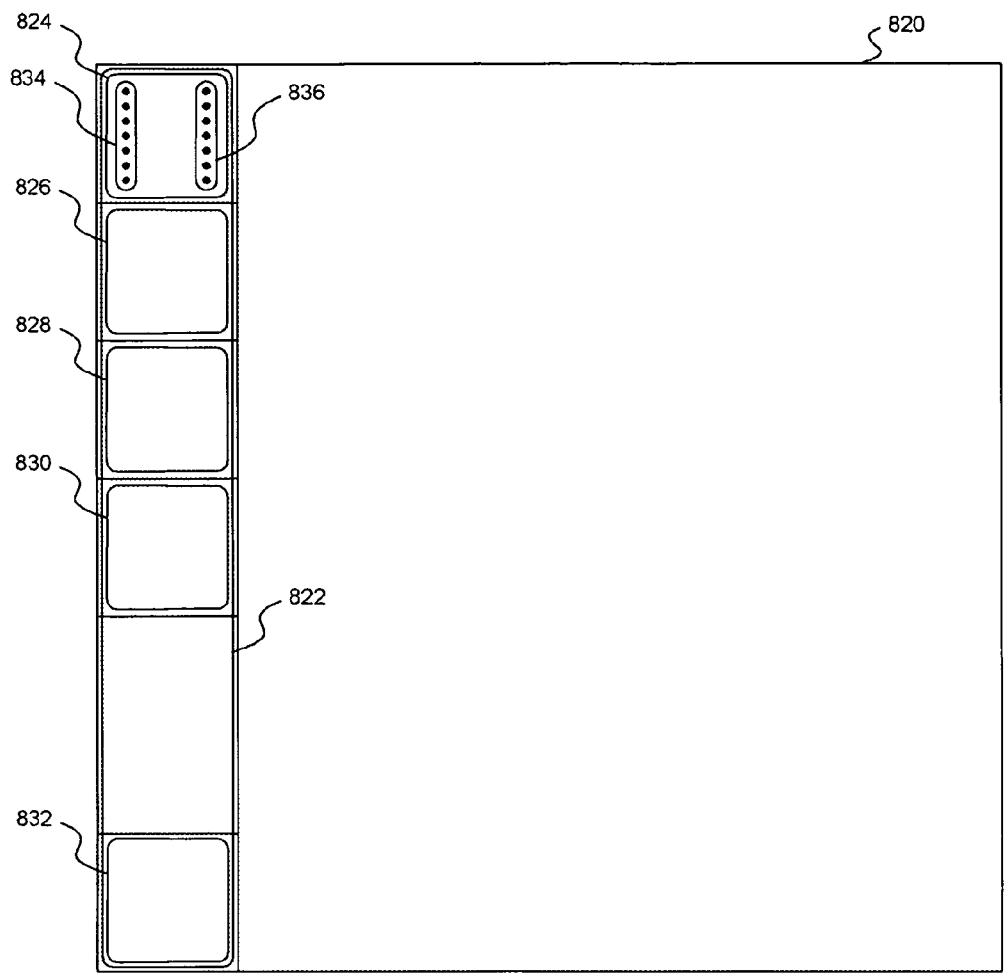
FIG. 8B illustrates a second source matrix used in the tiled matrix multiplication operation of FIG. 7.
Figure 8C:
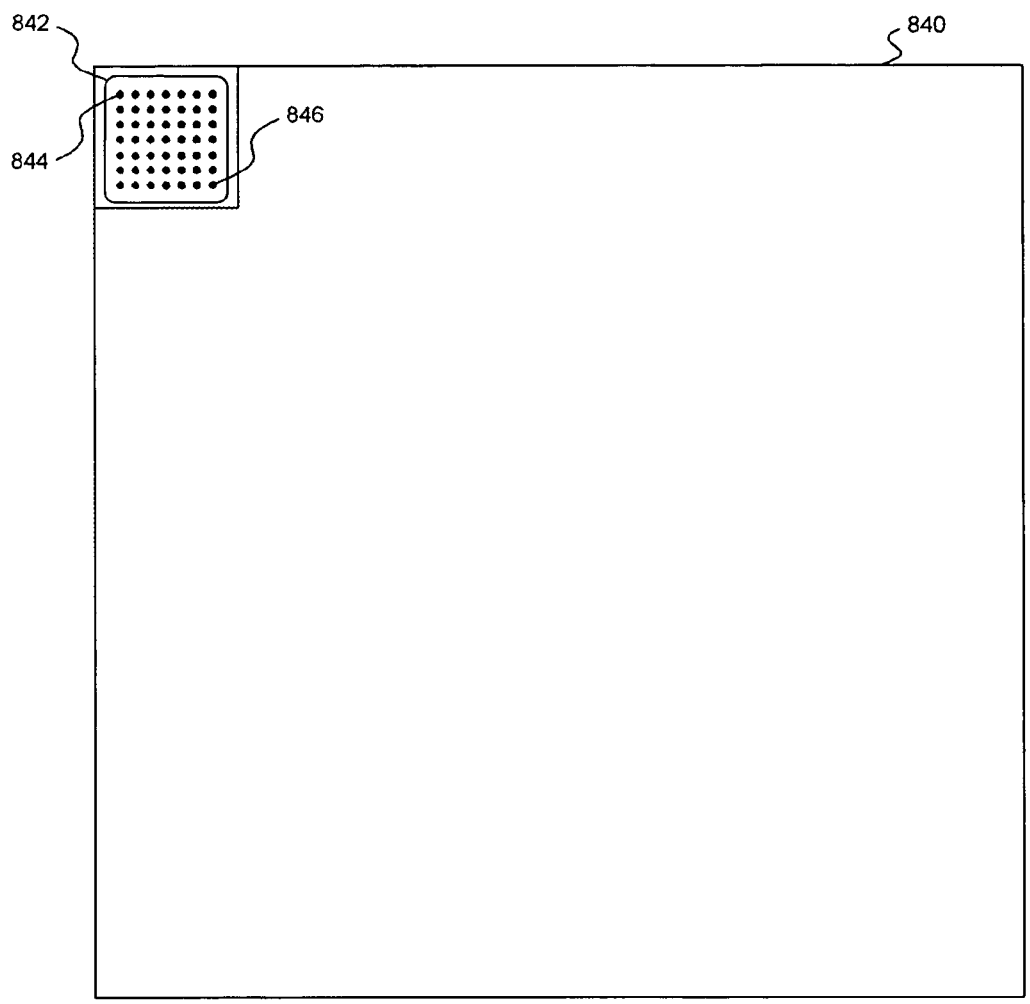
FIG. 8C illustrates a tile of a result matrix computed using the tiled matrix multiplication operation of FIG. 7.

FIG. 7 sets forth a method for performing a tiled matrix multiplication operation, according to one embodiment of the invention. For purposes of discussion only, it is assumed that one CTA executing on one of the streaming multiprocessors of graphics processing unit 200 is computing the elements of a result tile 842 of a result matrix 840, as illustrated in FIG. 8C, by performing conventional operations of multiplying each source tile from a tile row 802 of a source matrix 800 with a corresponding source tile from a tile column 822 of a source matrix 820, as illustrated in FIGS. 8A-8B, and accumulating the partial dot-products from those multiplication operations. Selecting which tile row of source matrix 800 should be multiplied by which tile column of source matrix 820 to compute a particular result tile of result matrix 840 is well-known and depends on the position of the result tile within result matrix 840. Therefore, this information is not covered in detail herein. Although the method steps are described with respect to one CTA executing on one of the streaming multiprocessors of the graphics processing unit 200 of FIG. 2, persons skilled in the art will understand that any system configured to execute the method steps, in any order, is within the scope of the present invention.

The method for performing the tiled matrix multiplication operation begins in step 700, where the CTA initializes all partial dot products to zero. In step 701, the CTA copies a source tile 804 from tile row 802 of source matrix 800 from the global memory 202 to the local memory coupled to the streaming multiprocessor. As previously described herein, the copy operation described herein preferably includes a series of coalesced read operations from the global memory 202. Further, the write operations to the local memory are preferably performed without any memory bank conflicts. The mapping of the threads of the CTA to the individual source tile elements to enable such read and write operations is described in greater detail below in conjunction with FIGS. 9-10D. In addition, as persons skilled in the art will appreciate, the source tiles of source matrices 800 and 820 have the same dimensions as the result tiles of result matrix 840.

In step 702, the CTA copies a source tile 824 from tile column 822 of source matrix 820 from the global memory 202 to the local memory coupled to the serial multiprocessor. Again, as is well-understood, source tile 824 is the tile in tile column 822 having a position that corresponds to the position of source tile 804 in tile row 802 for purposes of a tiled matrix multiplication operation. In step 704, a software process requests that the synchronization logic residing in the streaming multiprocessor on which the CTA is executing initiate a synchronization operation. Synchronizing the threads at this point in the method ensures that the source tiles are copied completely to the local memory before attempting to use the source tile data in subsequent partial dot product computation operations.

In step 706, the threads of the CTA compute the partial dot products for the elements of result tile 842 and write the partial dot products to the local registers assigned to the different threads where the partial dot products are accumulated. As described in greater detail below in conjunction with FIGS. 9-10A, each thread of the CTA may compute the partial dot products for one or more elements of result tile 842. The mapping of the threads of the CTA to the individual result tile elements to enable the partial dot product computations and accumulations is also set forth in FIGS. 9-10A. Partial dot product computations using tiles is well-known and, therefore, are described only briefly herein. Referring to FIGS. 8A-8C, to compute and accumulate the partial dot products of an element 844 of result tile 842, the thread assigned to element 844 would compute the partial dot products of a row 814 of source tile 804 and a column 834 of source tile 824. The thread would access the elements of row 814 and column 834 from the local memory for these computations and then write the resulting partial dot products to the local registers assigned to the thread where the partial dot products would accumulate. Likewise, to compute and accumulate the partial dot products of an element 846 of result tile 842, the thread assigned to element 846 would compute the partial dot products of a row 816 of source tile 804 and a column 836 of source tile 824. Again, the thread would access the elements of row 816 and column 836 from the local memory for these computations and then write the resulting partial dot products to the local registers assigned to the thread where the partial dot products would accumulate.

In step 708, the CTA determines whether all of the source tiles from tile row 802 of source matrix 800 have been exhausted. If the CTA determines that all of the source tiles from tile row 802 have not been exhausted, then the method proceeds to step 710, where the software process requests the synchronization logic residing in the streaming multiprocessor to initiate another synchronization operation. Synchronizing the threads at this point in the method ensures that the dot product computations are complete, thereby allowing the CTA to safely overwrite the current source tile copies in the LMEM with another pair of source tile copies.

The method then returns to step 701, where the CTA copies another source tile from tile row 802 of source matrix 800 and the corresponding source tile from tile column 822 of source matrix 820 from the global memory 202 to the local memory and computes another series of partial dot products using these two new source tiles. Again, as the CTA loops through steps 701-710, as described herein, the partial dot products computed at step 706 are accumulated in local registers assigned to each thread of the CTA. Persons skilled in the art will recognize that the source tiles copied from tile row 802 and the corresponding source tiles copied from tile column 822 may be copied to the local memory in any order since the partial dot products computed and accumulated in the local registers in step 706 may be added together in any order.

Referring now back to step 708, if the CTA determines that all of the source tiles from the tile row 802 have been exhausted, then the computation of the elements of result tile 824 is complete, and the method proceeds to step 712. In step 712, the CTA writes computed result tile 824 to the global memory 202. The method then terminates in step 714.

As previously described above in conjunction with FIGS. 4A-6, multiple CTAs may execute on the graphics processing unit 200 concurrently, where each computes a different result tile of result matrix 840 by executing the method steps of FIG. 7. In one embodiment, a CTA may execute on each of the streaming multiprocessors of the graphics processing unit 200. In an alternative embodiment, more than one CTA may execute on one or more of the streaming multiprocessors. In yet other alternative embodiments, one or more CTAs may execute on some, but not all, of the streaming multiprocessors. In view of the foregoing, persons skilled in the art will understand that the present invention is in no way limited by the number of CTAs running on any of the streaming multiprocessors of the graphics processing unit 200.

One advantage of the foregoing method is that by copying the source tiles to local memory and accumulating the partial dot products in local registers, the number of times the global memory 202 is accessed by the CTAs when computing the result tiles of a result matrix may be substantially reduced. Thus, the latencies associated with accessing source tile data normally encountered with prior art architectures may also be substantially reduced. Further, since the local memory has a larger memory bandwidth relative to the global memory 202, copying the source tile data to the local memories enables repeated parallel memory accesses over larger bandwidth paths. Thus, the present invention overcomes the memory bandwidth limitations typically encountered when performing matrix operations with conventional graphics processors.

Figure 9:
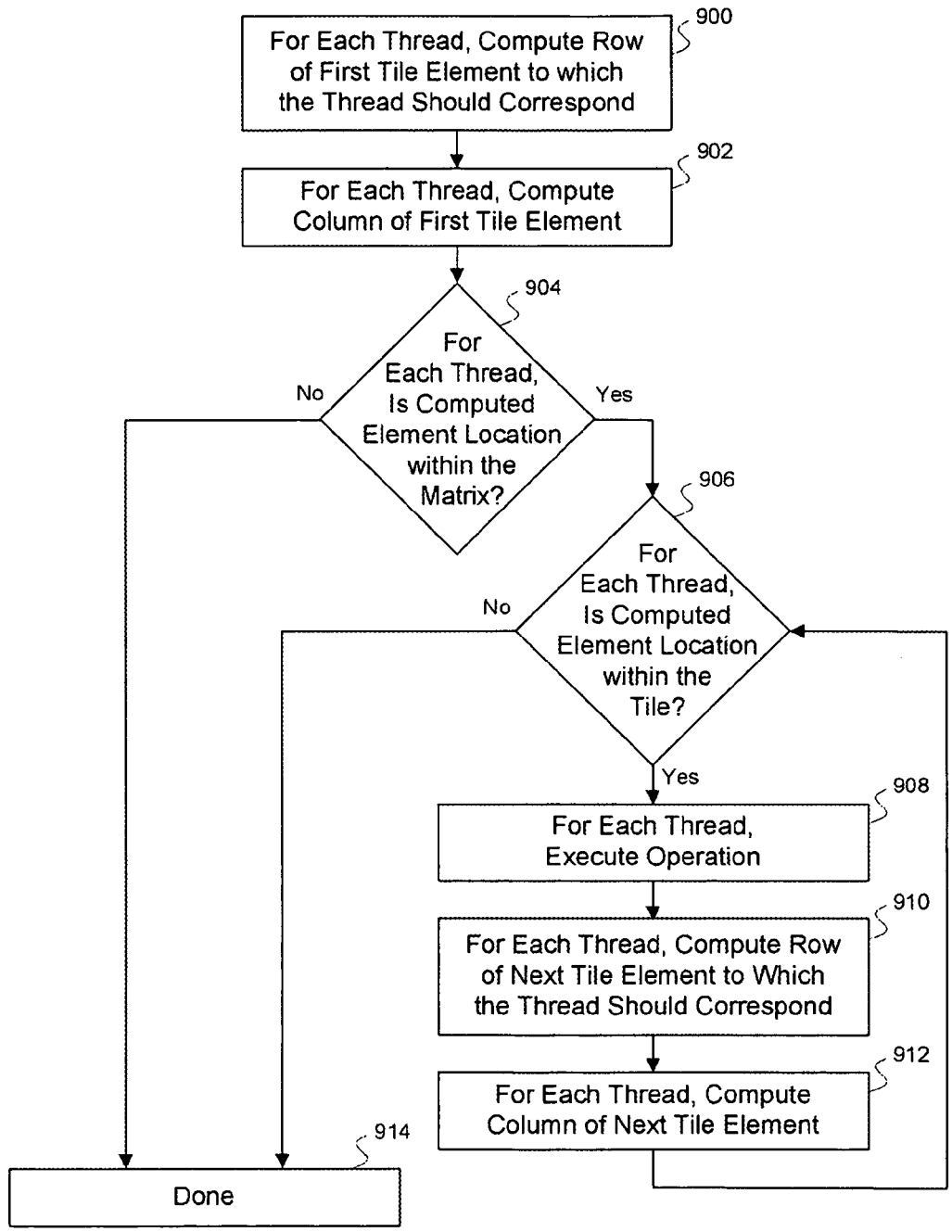
FIG. 9 illustrates a flowchart of method steps for allocating work among the threads of a CTA when performing a non-transposed copy operation or a result tile computation, according to one embodiment of the invention.
Figures 10A, 10B:
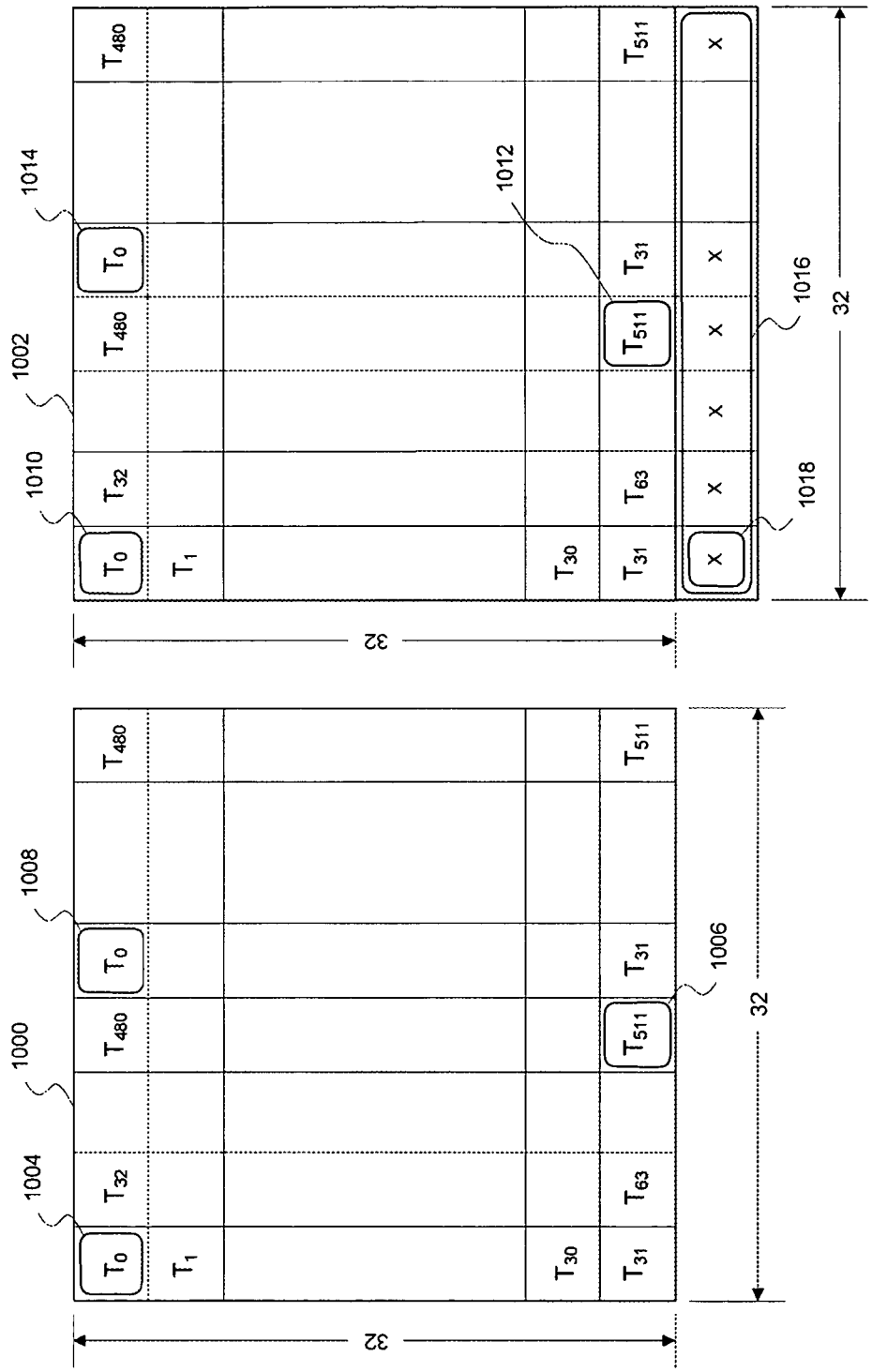
FIG. 10A illustrates a mapping of threads within a CTA to individual source tile elements when reading a source tile from the GMEM of FIG. 2 during a non-transposed copy operation and to individual result tile elements when performing a result tile computation, according to one embodiment of the invention.
FIG. 10B illustrates a mapping of threads within a CTA to individual source tile elements when writing a source tile to a local memory during a non-transposed copy operation, according to one embodiment of the invention.

FIG. 9 illustrates a flowchart of method steps for allocating work among the threads of a CTA when performing a non-transposed copy operation or a result tile computation, according to one embodiment of the invention. For purposes of discussion only, it is assumed that one CTA executing on one of the streaming multiprocessors of the graphics processing unit 200 is either copying the elements of a 32×32 source tile 1000 stored in the GMEM 202, as illustrated in FIG. 10A, to local memory to create a 32×32 local memory tile 1002, as illustrated in FIG. 10B, or computing the elements of a 32×32 result tile 1000 stored in the GMEM 202. For the non-transposed copy operation, the positions of the tile elements of source tile 1000 are first determined, and then the tile elements are copied to the corresponding tile element positions in local memory tile 1002 using the GMEM-to-LMEM address mapping shown in FIGS. 10A and 10B. For the result tile computation, the positions of the tile elements of result tile 1000 are first determined, and then the tile elements are computed according to the method of FIG. 7. Although the method steps are described with respect to a plurality of threads within a CTA executing on one of the streaming multiprocessors of the graphics processing unit 200 of FIG. 2, persons skilled in the art will understand that any system configured to execute the method steps, in any order, is within the scope of the present invention. In addition, as those skilled in the art will recognize, the row and column computations described in the method of FIG. 9 are tailored for a column-major storage arrangement. However, the changes required to accommodate other storage arrangements, such as a row-major storage arrangement, are readily apparent to those skilled in the art and therefore fall within the scope of the present invention.

The method of allocating work among the threads of a CTA begins in step 900, where each thread computes the row within the source or result tile 1000 where the first tile element, to which the thread should correspond, is located. This step has two parts. First, the row position of the source or result tile 1000 within the source or result matrix in the GMEM 202 is computed by multiplying the tile row coordinate of the source or result tile 1000, which is known to each thread, by the height of the source or result tile 1000. Once the row position of the source or result tile 1000 is known, each thread computes the row within the source or result tile 1000 where the first tile element is located by adding the remainder of an integer division of the thread ID of the thread by the height of the source or result tile 1000 to the row position of the source or result tile 1000 computed in the first part (each thread in the CTA knows its own thread ID).

In step 902, each thread computes the column within the source or result tile 1000 where the first tile element is located. Again, this step has two parts. First, the column position of the source or result tile 1000 within the source or result matrix in the GMEM 202 is computed by multiplying the tile column coordinate of the source or result tile 1000, which is known to each thread, by the width of the source or result tile 1000. Once the column position of the source or result tile 1000 is known, each thread computes the column within the source or result tile 1000 where the first tile element is located by adding the quotient of an integer division of the thread ID of the thread by the height of the source or result tile 1000 to the column position of the source or result tile 1000 computed in the first part.

In step 904, each thread verifies that the element location denoted by the row and column computed in steps 900 and 902 is within the source or result matrix (stored in the GMEM 202). If the computed element location for a particular thread is not within the source or result matrix, then the method terminates for that thread in step 914, where the thread pauses. However, if the computed element location is within the source or result matrix, then the method proceeds to step 906, where each thread verifies that its computed element location is within the source or result tile 1000. If the computed element location for a particular thread is not within the source or result tile 1000, then the method terminates for that thread in step 914, where the thread pauses. However, if the computed element location is within the source or result tile 1000, then the method proceeds to step 908, where each thread whose computed element location is within the source or result tile 1000 executes a non-transposed copy operation or an operation involving the computation and accumulation of partial dot products.

As shown in FIG. 10A, threads with thread IDs zero through thirty-one correspond to the first column of tile elements in the source or result tile 1000 (stored in the GMEM 202). For the non-transposed copy operation, as shown in FIG. 10B, the same threads correspond to the first column of tile elements in the local memory tile 1002 (stored in local memory). Thus, for the non-transposed copy operation, assuming that the CTA includes 512 threads and each element location within the source tile 1000 is within the source matrix, the threads of the CTA copy tile elements 1004 through 1006 in the source tile 1000 to locations 1010 through 1012 in the local memory tile 1002. As FIGS. 10A and 10B make clear, the tile element locations for the copy operation are non-transposed between the source tile 1000 and the local memory tile 1002. In a subsequent execution of step 908 of the non-transposed copy operation, when the threads of the CTA perform another non-transposed copy operation based on the next set of row and column positions computed in steps 910 and 912, the threads may copy the tile elements of the source tile 1000 starting with a tile element 1008 and write the tile elements to locations in the local memory tile 1002 starting with a tile element 1014.

Importantly, when copying tile elements from the source tile 1000 (stored in the GMEM 202), the threads of each thread group in the CTA may perform coalesced read operations from the GMEM 202, thereby maximizing bandwidth across the very wide interface to the GMEM 202 and reducing the read latency per CTA. Read coalescing is made possible by opportunistically matching contiguous and aligned thread IDs within the CTA to contiguous and aligned memory addresses within the source tile 1000.

In step 910, each thread computes the row within the source or result tile 1000 where the next tile element, to which the thread should correspond, is located. Since the row position of the source or result tile 1000 within the source or result matrix is already known, each thread simply computes the row within the source or result tile 1000 where the next tile element is located by adding the remainder of an integer division of a scaled thread ID of the thread by the height of the source or result tile 1000 to the row position of the source or result tile 1000 previously computed in step 900. The scaled thread ID of the thread is the sum of the thread ID of the thread and the product of the number of threads in the CTA and the number of times step 910 has been executed, inclusive of the current execution step.

One should note that in a preferred embodiment, if the number of threads in the CTA is equal to an integer multiple of the source or result tile height, each thread in the CTA performs operations on an equal number of source or result tile elements. Accordingly, the plurality of source or result tile elements for each thread in the CTA are separated by the aforementioned integer number of columns and zero rows, thereby allowing the method to advantageously reuse the row computations from step 900 in the subsequent row computations of step 910.

In step 912, each thread computes the column within the source or result matrix 1000 where the next tile element is located. Since the column position of the source or result tile 1000 within the source or result matrix is already known, each thread simply computes the column within the source or result tile 1000 where the next tile element is located by adding the quotient of an integer division of the scaled thread ID of the thread by the height of the source or result tile 1000 to the column position of the source or result tile 1000 previously computed in step 902. The scaled thread ID of the thread is reused from step 910. As described above, in the preferred embodiment where the number of threads in the CTA is equal to an integer multiple of the source or result tile height, the next tile element is separated from the current tile element by the aforementioned integer number of columns. After completing steps 910 and 912, the method returns to step 906.

One advantage of the foregoing method is that it enables coalesced read operations when source matrix data is copied from the GMEM 202 to local memory during the non-transposed copy operation.

Figure 11:
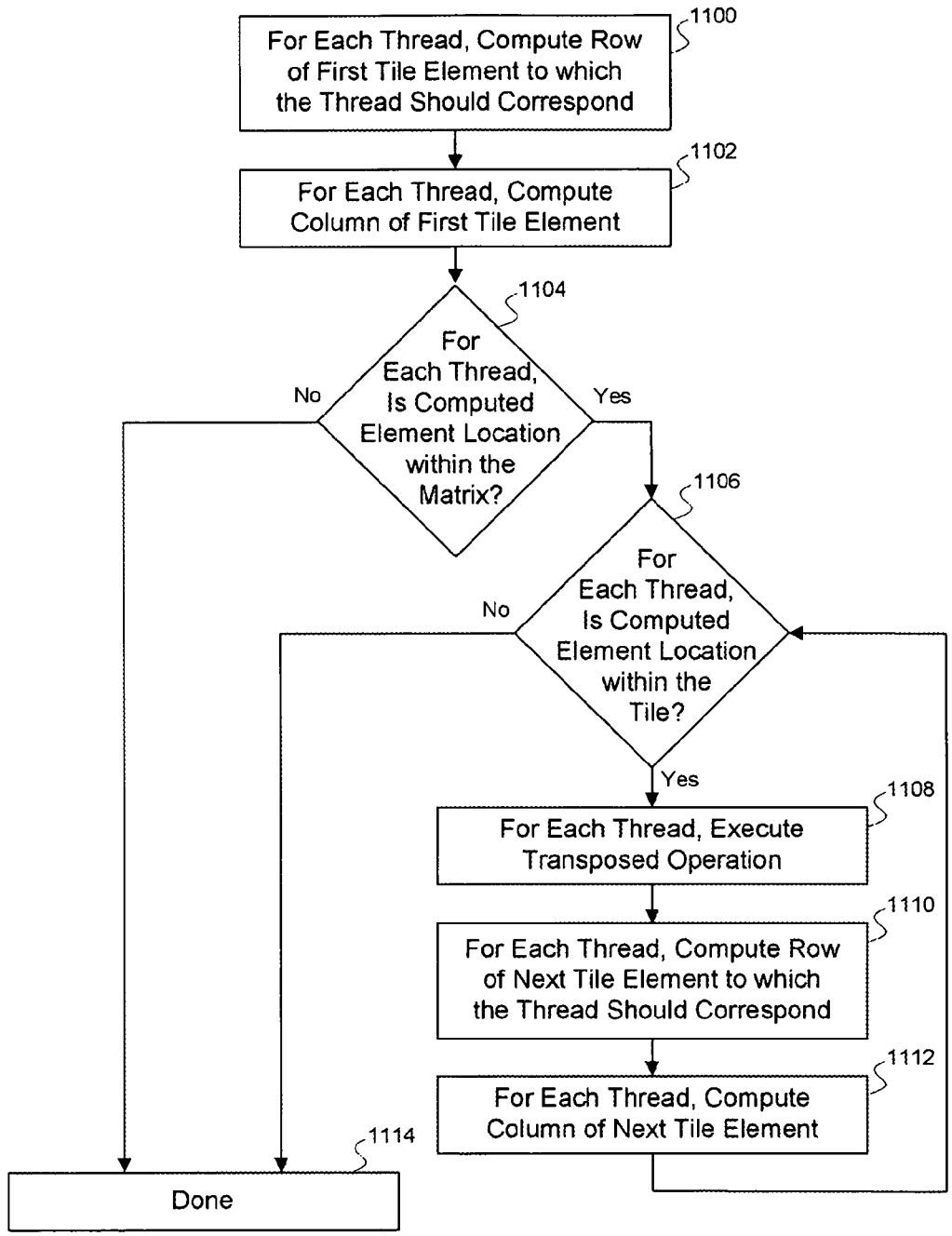
FIG. 11 illustrates a flowchart of method steps for allocating work among the threads of a CTA when performing a transposed copy operation, according to one embodiment of the invention.

FIG. 11 illustrates a flowchart of method steps for allocating work among the threads of a CTA when performing a transposed copy operation, according to one embodiment of the invention. For purposes of discussion only, it is assumed that one CTA executing on one of the streaming multiprocessors of graphics processing unit 200 is copying the elements of a 32×32 source tile 1200 stored in the GMEM 202, as illustrated in FIG. 12A, to local memory to create a 32×32 local memory tile 1202, as illustrated in FIG. 12B. More specifically, the element positions of source tile 1200 are first determined, and then the tile elements are copied to the corresponding transposed element positions in local memory tile 1202 using the GMEM-to-LMEM address mapping shown in FIGS. 12A and 12B. Importantly, local memory tile 1202 includes a pad row 1216 of pad elements (e.g., a pad element 1218) which may prevent bank conflicts between concurrently executing threads when writing tile elements to generate the local memory tile 1202. Since the technique of including pad rows to prevent bank conflicts when performing a transposition operation is well-known, it will not be discussed further herein. Although the method steps are described with respect to a plurality of threads within a CTA executing on one of the streaming multiprocessors of the graphics processing unit 200 of FIG. 2, persons skilled in the art will understand that any system configured to execute the method steps, in any order, is within the scope of the present invention. In addition, the row and column computations described in the method of FIG. 11 are tailored for a column-major storage arrangement. However, the changes required to accommodate other storage arrangements, such as a row-major storage arrangement, are readily apparent to those skilled in the art and therefore fall within the scope of the present invention.

The method of allocating work among the threads of a CTA begins in step 1100, where each thread computes the row within the source tile 1200 where the first tile element, to which the thread should correspond, is located. This step has two parts. First, the row position of the source tile 1200 within the source matrix in the GMEM 202 is computed by multiplying the tile row coordinate of the source tile 1200, which is known to each thread, by the height of the source tile 1200. Once the row position of the source tile 1200 is known, each thread computes the row within the source tile 1200 where the first tile element is located by adding the remainder of an integer division of the thread ID of the thread by the height of the source tile 1200 to the row position of the source tile 1200 computed in the first part (each thread in the CTA knows its own thread ID).

In step 1102, each thread computes the column within the source tile 1200 where the first tile element is located. Again, this step has two parts. First, the column position of the source tile 1200 within the source matrix in the GMEM 202 is computed by multiplying the tile column coordinate of the source tile 1200, which is known to each thread, by the width of the source tile 1200. Once the column position of the source tile 1200 is known, each thread computes the column within the source tile 1200 where the first tile element is located by adding the quotient of an integer division of the thread ID of the thread by the height of the source tile 1200 to the column position of the source tile 1200 computed in the first part.

In step 1104, each thread verifies that the element location denoted by the row and column computed in steps 1100 and 1102 is within the source matrix (stored in the GMEM 202). If the computed element location for a particular thread is not within the source matrix, then the method terminates for that thread in step 1114, where the thread pauses. However, if the computed element location is within the source matrix, then the method proceeds to step 1106, where each thread verifies that its computed element location is within the source tile 1200. If the computed element location for a particular thread is not within the source tile 1200, then the method terminates for that thread in step 1114, where the thread pauses. However, if the computed element location is within the source tile 1200, then the method proceeds to step 1108, where each thread whose computed element location is within the source tile 1200 executes a transposed copy operation.

As shown in FIG. 12A, threads with thread IDs zero through thirty-one correspond to the first column of tile elements in the source tile 1200 (stored in the GMEM 202). As shown in FIG. 12B, the same threads correspond to the first row of tile elements in the local memory tile 1202 (stored in local memory). Thus, assuming that the CTA includes 512 threads and each element location within the source tile 1200 is within the source matrix, the threads of the CTA copy tile elements 1204 through 1206 in the source tile 1200 to locations 1210 through 1212 in the local memory tile 1202. As FIGS. 12A and 12B make clear, the tile element locations are transposed between the source tile 1200 and the local memory tile 1202. In a subsequent execution of step 1108, when the threads of the CTA perform another copy and transpose operation based on the next set of row and column positions computed in steps 1110 and 1112, the threads may copy the tile elements of the source tile 1200 starting with a tile element 1208 and transpose and write the tile elements to locations in the local memory tile 1202 starting with a tile element 1214.

Importantly, when copying tile elements from the source tile 1200 (stored in the GMEM 202), the threads of each thread group in the CTA may perform coalesced read operations from the GMEM 202, thereby maximizing memory throughput, minimizing load time and reducing average latency. Read coalescing is made possible by opportunistically matching contiguous and aligned thread IDs within the CTA to contiguous and aligned memory addresses within the source tile 1200.

In step 1110, each thread computes the row within the source matrix 1200 where the next tile element, to which the thread should correspond, is located. Since the row position of the source tile 1200 within the source matrix is already known, each thread simply computes the row within the source tile 1200 where the next tile element is located by adding the remainder of an integer division of a scaled thread ID of the thread by the height of the source tile 1200 to the row position of the source tile 1200 previously computed in step 1100. The scaled thread ID of the thread is the sum of the thread ID of the thread and the product of the number of threads in the CTA and the number of times step 1110 has been executed, inclusive of the current execution step.

One should note that in a preferred embodiment, if the number of threads in the CTA is equal to an integer multiple of the source tile height, each thread in the CTA performs operations on an equal number of source tile elements. Accordingly, the plurality of source tile elements for each thread in the CTA are separated by the aforementioned integer number of columns and zero rows, thereby allowing the method to advantageously reuse the row computations from step 1100 in the subsequent row computations of step 1110.

In step 1112, each thread computes the column within the source matrix 1200 where the next tile element is located. Since the column position of the source tile 1200 within the source matrix is already known, each thread simply computes the column within the source tile 1200 where the next tile element is located by adding the quotient of an integer division of the scaled thread ID of the thread by the height of the source tile 1200 to the column position of the source tile 1200 previously computed in step 1102. The scaled thread ID of the thread is reused from step 1110. As described above, in the preferred embodiment, where the number of threads in the CTA is equal to an integer multiple of the source or result tile height, the next tile element is separated from the current tile element by the aforementioned integer number of columns. After completing steps 1110 and 1112, the method returns to step 1106.

One advantage of the foregoing method is that it enables coalesced read operations when source matrix data is copied from the GMEM 202 to local memory. Another advantage that it enables source matrix data to be transposed and written to local memory while avoiding bank conflicts that may otherwise occur when writing a column of source matrix data stored in the GMEM 202 to a row of a source tile stored in local memory. More specifically, the use of a pad row in the source tile stored in local memory may prevent bank conflicts during copy and transpose operations, thereby improving memory performance.

While the foregoing is directed to embodiments of the present invention, other and further embodiments of the invention may be devised without departing from the basic scope thereof. The scope of the present invention is determined by the claims that follow

We claim:

1. A system configured to compute partial dot products for a matrix multiplication operation, the system comprising:
   a global memory configured to store a first source matrix, a second source matrix and a result matrix;
   a processing unit configured to execute a cooperative thread array, wherein the processing unit includes hardware logic configured to synchronize the threads of the cooperative thread array by pausing one or more of the threads at a specific instruction until all threads in the cooperative thread array reach the specific instruction;
   a local memory coupled to the processing unit and configured to store at least one tile of the first source matrix and at least one tile of the second source matrix; and
   a plurality of local registers coupled to the processing unit, wherein the cooperative thread array is configured to:
      copy a first tile from a first row of the first source matrix from the global memory to the local memory,
      copy a first tile from a first column of the second source matrix from the global memory to the local memory, wherein the first tile copied from first column of the second source matrix corresponds to the first tile copied from first row of the first source matrix,
      compute partial dot products for elements of a first tile of the result matrix based on elements of the first tile copied from the first row of the first source matrix and elements of the first tile copied from the first column of the second source matrix, and
      store the partial dot products for the elements of the first tile of the result matrix in the plurality of local registers, and
   wherein the hardware logic synchronizes the threads of the cooperative thread array after the first tile from the first row of the first source matrix and the first tile from the first column of the second source matrix are copied to the local memory but before the cooperative thread array begins computing the partial dot products for the elements of the first tile of the result matrix.

2. The system of claim 1, wherein the cooperative thread array is further configured to determine whether all tiles from the first row of the first source matrix and from the first column of the second source matrix necessary to compute the elements of the first tile of the result matrix have been exhausted, after the partial dot products of the elements of the first tile of the result matrix are computed.

3. The system of claim 2, wherein the hardware logic synchronizes the threads of the cooperative thread array, if all tiles from the first row of the first source matrix and from the first column of the second source matrix necessary to compute the elements of the first tile of the result matrix have not been exhausted.

4. The system of claim 3, wherein the cooperative thread array is further configured to copy a second tile from the first row of the first source matrix from the global memory to the local memory and to copy a second tile from the first column of the second source matrix from the global memory to the local memory, wherein the second tile copied from first column of the second source matrix corresponds to the second tile copied from the first row of the first source matrix.

5. The system of claim 2, wherein the cooperative thread array is further configured to write the computed elements of the first tile of the result matrix to the global memory from the plurality of local registers, if all tiles from the first row of the first source matrix and from the first column of the second source matrix necessary to compute the elements of the first tile of the result matrix have been exhausted.

6. The system of claim 1, wherein the cooperative thread array includes at least one group of concurrently executing threads.

7. The system of claim 6, wherein the group of concurrently executing threads includes n threads, and the local memory includes at least n memory banks, such that each of the concurrently executing threads can access a different one of the at least n memory banks simultaneously.

8. The system of claim 1, further comprising:
   a second processing unit configured to execute a second cooperative thread array, wherein the second processing unit includes hardware logic configured to synchronize the threads of the second cooperative thread array;
   a second local memory coupled to the second processing unit and configured to store at least one tile of the first source matrix and at least one tile of the second source matrix; and
   a second plurality of local registers coupled to the second processing unit,
   wherein the processing unit is configured to execute a second cooperative thread array configured to:
      copy the first tile from the first row of the first source matrix from the global memory to the second local memory,
      copy a first tile from a second column of the second source matrix from the global memory to the second local memory, wherein the first tile copied from the second column of the second source matrix corresponds to the first tile copied from the first row of the first source matrix,
      compute partial dot products for elements of a second tile of the result matrix based on elements of the first tile copied from the first row of the first source matrix and elements of the first tile copied from the second column of the second source matrix, and
      store the partial dot products for the elements of the second tile of the result matrix in the second plurality of local registers, and
   wherein the hardware logic synchronizes the threads of the second cooperative thread array after the first tile from the first row of the first source matrix and the first tile from the second column of the second source matrix are copied to the second local memory but before the cooperative thread array begins computing the partial dot products for the elements of the second tile of the result matrix.

9. The system of claim 8, wherein the cooperative thread array and the second cooperative thread array execute concurrently.

10. The system of claim 8, wherein the hardware logic included in the second processing unit synchronizes the threads of the second cooperative thread array after the partial dot products for the elements of the second tile of the result matrix are computed.

11. The system of claim 1, further comprising:
a second processing unit configured to execute a second cooperative thread array, wherein the second processing unit includes hardware logic configured to synchronize the threads of the second cooperative thread array;
a second local memory coupled to the second processing unit and configured to store at least one tile of the first source matrix and at least one tile of the second source matrix; and
a second plurality of local registers coupled to the second processing unit,
wherein the processing unit is configured to execute a second cooperative thread array configured to:
copy a first tile from a second row of the first source matrix from the global memory to the second local memory,
copy the first tile from the first column of the second source matrix from the global memory to the second local memory, wherein the first tile copied from the first column of the second source matrix corresponds to the first tile copied from the second row of the first source matrix,
compute partial dot products for elements of a second tile of the result matrix based on elements of the first tile copied from the second row of the first source matrix and elements of the first tile from the first column of the second source matrix, and
store the partial dot products for the elements of the second tile of the result matrix in the second plurality of local registers, and
wherein the hardware logic synchronizes the threads of the second cooperative thread array after the first tile from the second row of the first source matrix and the first tile from the first column of the second source matrix are copied to the second local memory but before the cooperative thread array begins computing the partial dot products for the elements of the second tile of the result matrix.

12. The system of claim 11, wherein the cooperative thread array and the second cooperative thread array execute concurrently.

13. The system of claim 11, wherein the hardware logic included in the second processing unit synchronizes the threads of the second cooperative thread array after the partial dot products for the elements of the second tile of the result matrix are computed.

14. A computing device configured to compute partial dot products for a matrix multiplication operation, the computing device comprising:
a global memory configured to store a first source matrix, a second source matrix and a result matrix; and
a graphics processor coupled to the global memory that includes:
a processing unit configured to execute a cooperative thread array, wherein the processing unit includes hardware logic configured to synchronize the threads of the cooperative thread array by pausing one or more of the threads at a specific instruction until all threads in the cooperative thread array reach the specific instruction,
a local memory coupled to the processing unit and configured to store at least one tile of the first source matrix and at least one tile of the second source matrix, and
a plurality of local registers coupled to the processing unit,
wherein the cooperative thread array is configured to:
copy a first tile from a first row of the first source matrix from the global memory to the local memory,
copy a first tile from a first column the second source matrix from the global memory to the local memory, wherein the first tile copied from the first column of the second source matrix corresponds to the first tile copied from the first row of the first source matrix,
compute partial dot products for elements of a first tile of the result matrix based on elements of the first tile copied from the first row of the first source matrix and elements of the first tile copied from the first column of the second source matrix, and
store the partial dot products for the elements of the first tile of the result matrix in the plurality of local registers, and
wherein the hardware logic synchronizes the threads of the cooperative thread array after the first tile from the first row of the first source matrix and the first tile from the first column of the second source matrix are copied to the local memory but before the cooperative thread array begins computing the partial dot products for the elements of the first tile of the result matrix.

15. The computing device of claim 14, wherein the cooperative thread array is further configured to determine whether all tiles from the first row of the first source matrix and from the first column of the second source matrix necessary to compute the elements of the first tile of the result matrix have been exhausted, after the partial dot products of the elements of the first tile of the result matrix are computed.

16. The computing device of claim 15, wherein the hardware logic synchronizes the threads of the cooperative thread array, if all tiles from the first row of the first source matrix and from the first column of the second source matrix necessary to compute the elements of the first tile of the result matrix have not been exhausted.

17. The computing device of claim 16, wherein the cooperative thread array is further configured to copy a second tile from the first row of the first source matrix from the global memory to the local memory and to copy a second tile from the first column of the second source matrix from the global memory to the local memory, wherein the second tile copied from first column of the second source matrix corresponds to the second tile copied from the first row of the first source matrix.

18. The computing device of claim 15, wherein the cooperative thread array is further configured to write the computed elements of the first tile of the result matrix to the global memory from the plurality of local registers, if all tiles from the first row of the first source matrix and from the first column of the second source matrix necessary to compute the elements of the first tile of the result matrix have been exhausted.

19. The computing device of claim 14, wherein the cooperative thread array includes at least one group of concurrently executing threads.

20. The computing device of claim 19, wherein the group of concurrently executing threads includes n threads, and the local memory includes at least n memory banks, such that each of the concurrently executing threads can access a different one of the at least n memory banks simultaneously.

* * * * *